(12) United States Patent
Lowther et al.

(10) Patent No.: US 12,536,264 B2
(45) Date of Patent: Jan. 27, 2026

(54) PARALLEL ARTIFICIAL INTELLIGENCE DRIVEN IDENTITY CHECKING WITH BIOMETRIC PROMPTING

(71) Applicant: The Toronto-Dominion Bank, Toronto (CA)

(72) Inventors: Emily Anne Lowther, Elmira (CA); Claire Iona Wilcox, Toronto (CA); Susan Marjorie Juvet, Toronto (CA); Jeffrey M. Grace, Delaware (CA); Shuyun Huang, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 7 days.

(21) Appl. No.: 18/778,111

(22) Filed: Jul. 19, 2024

(65) Prior Publication Data
US 2026/0023832 A1    Jan. 22, 2026

(51) Int. Cl.
*G06F 21/00* (2013.01)
*G06F 21/32* (2013.01)

(52) U.S. Cl.
CPC .................... *G06F 21/32* (2013.01)

(58) Field of Classification Search
CPC ................ G06F 21/32; G06F 21/31
See application file for complete search history.

(56) References Cited

U.S. PATENT DOCUMENTS

| | | | |
|---|---|---|---|
| 9,864,982 B2 | 1/2018 | Bristow et al. | |
| 10,163,085 B2 | 12/2018 | D'Agostino et al. | |
| 10,178,246 B1 | 1/2019 | Horvath et al. | |
| 10,181,114 B2 | 1/2019 | Tseretopoulos et al. | |
| 10,339,931 B2 | 7/2019 | Tseretopoulos et al. | |
| 10,346,824 B2 | 7/2019 | Chan et al. | |
| 10,360,303 B2 | 7/2019 | Volkovs et al. | |
| 10,405,146 B1 | 9/2019 | Kuruvilla et al. | |
| 10,438,206 B2 | 10/2019 | Jivraj et al. | |
| 10,440,196 B2 | 10/2019 | Horvath et al. | |

(Continued)

OTHER PUBLICATIONS

Heglin et al., "Auto-Adjudication Process Via Machine Learning," U.S. Appl. No. 19/053,942, filed Feb. 14, 2025.

*Primary Examiner* — William A Corum, Jr.

(57) ABSTRACT

An example operation may include one or more of receiving application data via at least one data prompt on an application form on a computing device, receiving device data from the computing device, executing a trained artificial intelligence (AI) model to predict a data validity risk level based on the application data and the device data, determining at least one identity check to be performed based on the predicted data validity risk level, determining at least one additional data prompt needed to execute the at least one identity check, analyzing the application data being received, augmenting the application form on the computing device with the at least one additional data prompt based on the analyzed application data, wherein the at least one additional data prompt requests biometric data, wherein a type of biometric data is based on an amount the predicted data validity risk level is above a threshold, receiving additional application data based on the at least one additional data prompt on the computing device, and executing the at least one identity check based on the received additional application data.

20 Claims, 9 Drawing Sheets

(56) References Cited

U.S. PATENT DOCUMENTS

| | | |
|---|---|---|
| 10,440,197 B2 | 10/2019 | Horvath et al. |
| 10,460,748 B2 | 10/2019 | Tseretopoulos et al. |
| 10,482,675 B1 | 11/2019 | Sutter et al. |
| 10,659,400 B2 | 5/2020 | Moon et al. |
| 10,698,902 B2 | 6/2020 | Tseretopoulos et al. |
| 10,706,635 B2 | 7/2020 | Sutter et al. |
| 10,708,721 B2 | 7/2020 | Kuruvilla et al. |
| 10,728,259 B2 | 7/2020 | McCarter et al. |
| 10,776,619 B2 | 9/2020 | Collinson et al. |
| 10,824,941 B2 | 11/2020 | Volkovs et al. |
| 10,831,923 B2 | 11/2020 | Dunjic et al. |
| 10,832,047 B2 | 11/2020 | Moghtadai |
| 10,862,897 B2 | 12/2020 | D'Agostino et al. |
| 10,867,292 B2 | 12/2020 | Lin et al. |
| 10,867,293 B2 | 12/2020 | Bristow et al. |
| 10,878,816 B2 | 12/2020 | Tseretopoulos et al. |
| 10,902,220 B2 | 1/2021 | Lozon et al. |
| 10,922,665 B2 | 2/2021 | Miller et al. |
| 10,943,605 B2 | 3/2021 | Tseretopoulos et al. |
| 10,977,617 B2 | 4/2021 | Tseretopoulos et al. |
| 11,004,187 B2 | 5/2021 | Kuruvilla et al. |
| 11,017,028 B2 | 5/2021 | Dunjic et al. |
| 11,030,415 B2 | 6/2021 | Volkovs et al. |
| 11,055,924 B2 | 7/2021 | Navarro et al. |
| 11,061,638 B2 | 7/2021 | Lam |
| 11,070,448 B2 | 7/2021 | Miller et al. |
| 11,087,314 B2 | 8/2021 | Gandhi et al. |
| 11,100,168 B2 | 8/2021 | Miller et al. |
| 11,140,143 B2 | 10/2021 | Moon et al. |
| 11,144,921 B2 | 10/2021 | Dunjic et al. |
| 11,144,998 B2 | 10/2021 | Kuruvilla et al. |
| 11,145,169 B2 | 10/2021 | Pratten et al. |
| 11,182,860 B2 | 11/2021 | Kuruvilla et al. |
| 11,200,328 B2 | 12/2021 | Shpurov et al. |
| 11,200,411 B2 | 12/2021 | Rizvi et al. |
| 11,210,857 B2 | 12/2021 | Rizvi et al. |
| 11,222,286 B2 | 1/2022 | Choe et al. |
| 11,232,304 B2 | 1/2022 | Navarro et al. |
| 11,276,257 B2 | 3/2022 | Moghtadai et al. |
| 11,303,642 B2 | 4/2022 | Dunjic et al. |
| 11,334,574 B2 | 5/2022 | Caputo et al. |
| 11,347,744 B2 | 5/2022 | Tseretopoulos et al. |
| 11,349,871 B2 | 5/2022 | Moon et al. |
| 11,354,442 B2 | 6/2022 | Haldenby et al. |
| 11,361,566 B2 | 6/2022 | Collinson et al. |
| 11,373,229 B2 | 6/2022 | Tseretopoulos et al. |
| 11,392,776 B2 | 7/2022 | Lozon et al. |
| 11,393,020 B2 | 7/2022 | Mathew et al. |
| 11,394,668 B1 | 7/2022 | Subbunarayanan et al. |
| 11,397,765 B2 | 7/2022 | Volkovs et al. |
| 11,409,811 B2 | 8/2022 | D'Agostino |
| 11,411,734 B2 | 8/2022 | Shpurov et al. |
| 11,430,242 B2 | 8/2022 | Moghtadai |
| 11,436,809 B2 | 9/2022 | Rizvi et al. |
| 11,451,669 B1 | 9/2022 | Navarro et al. |
| 11,469,878 B2 | 10/2022 | Shpurov et al. |
| 11,470,091 B2 | 10/2022 | McCarter et al. |
| 11,470,143 B2 | 10/2022 | Joheb et al. |
| 11,475,059 B2 | 10/2022 | Liu et al. |
| 11,475,251 B2 | 10/2022 | Morin et al. |
| 11,477,265 B2 | 10/2022 | McPhee et al. |
| 11,507,622 B2 | 11/2022 | Grebenisan et al. |
| 11,507,868 B2 | 11/2022 | Kwong et al. |
| 11,546,345 B2 | 1/2023 | D'Agostino et al. |
| 11,580,762 B2 | 2/2023 | Rizvi et al. |
| 11,600,064 B2 | 3/2023 | Navarro et al. |
| 11,604,899 B2 | 3/2023 | Haldenby et al. |
| 11,620,741 B2 | 4/2023 | Kuruvilla et al. |
| 11,632,311 B2 | 4/2023 | Miller et al. |
| 11,651,100 B2 | 5/2023 | Dunjic et al. |
| 11,663,488 B2 | 5/2023 | Volkovs et al. |
| 11,671,536 B2 | 6/2023 | Navarro et al. |
| 11,687,995 B2 | 6/2023 | Tseretopoulos et al. |
| 11,689,484 B2 | 6/2023 | Moon et al. |
| 11,704,782 B2 | 7/2023 | Wakim et al. |
| 11,741,305 B2 | 8/2023 | Skaljin et al. |
| 11,743,210 B2 | 8/2023 | Moon et al. |
| 11,748,400 B2 | 9/2023 | Volkovs et al. |
| 11,756,388 B2 | 9/2023 | Pratten et al. |
| 11,777,918 B2 | 10/2023 | Moon et al. |
| 11,782,935 B2 | 10/2023 | Caputo et al. |
| 11,789,909 B2 | 10/2023 | Grebenisan et al. |
| 11,790,012 B2 | 10/2023 | D'Agostino |
| 11,790,354 B2 | 10/2023 | Gandhi et al. |
| 11,797,962 B2 | 10/2023 | Jones et al. |
| 11,809,486 B2 | 11/2023 | Liu et al. |
| 11,809,577 B2 | 11/2023 | Begg et al. |
| 11,811,826 B2 | 11/2023 | Moon et al. |
| 11,842,252 B2 | 12/2023 | Kuang et al. |
| 11,875,398 B2 | 1/2024 | Pratten et al. |
| 11,880,811 B2 | 1/2024 | Pawelkiewicz et al. |
| 11,886,764 B2 | 1/2024 | Lam |
| 11,928,112 B2 | 3/2024 | Dunjic et al. |
| 11,941,525 B2 | 3/2024 | Morin et al. |
| 11,941,703 B2 | 3/2024 | Kuruvilla et al. |
| 11,955,117 B2 | 4/2024 | McDermid et al. |
| 11,966,491 B2 | 4/2024 | D'Agostino |
| 11,978,085 B2 | 5/2024 | Rai et al. |
| 11,978,090 B2 | 5/2024 | Navarro et al. |
| 11,985,153 B2 | 5/2024 | Karl |
| 11,995,121 B2 | 5/2024 | Volkovs et al. |
| 12,008,315 B2 | 6/2024 | Miller et al. |
| 12,014,303 B2 | 6/2024 | Carvalho et al. |
| 12,019,594 B2 | 6/2024 | Floyd et al. |
| 12,021,874 B2 | 6/2024 | Dunjic et al. |
| 12,039,535 B2 | 7/2024 | Dunjic et al. |
| 12,052,363 B2 | 7/2024 | Shpurov et al. |
| 12,061,652 B2 | 8/2024 | Miller et al. |
| 12,067,130 B2 | 8/2024 | Shpurov et al. |
| 12,067,580 B2 | 8/2024 | Jeske et al. |
| 12,079,351 B2 | 9/2024 | Begg et al. |
| 12,106,220 B2 | 10/2024 | Volkovs et al. |
| 12,111,793 B2 | 10/2024 | Grebenisan et al. |
| 12,124,925 B2 | 10/2024 | Rho et al. |
| 12,136,079 B2 | 11/2024 | Jones et al. |
| 12,164,542 B1 | 12/2024 | Rahman et al. |
| 12,169,693 B2 | 12/2024 | Lu |
| 12,182,800 B2 | 12/2024 | Navarro et al. |
| 12,198,109 B2 | 1/2025 | Abbas |
| 12,198,510 B2 | 1/2025 | Pratten et al. |
| 12,210,534 B2 | 1/2025 | Cashion et al. |
| 12,211,274 B2 | 1/2025 | Ma et al. |
| 12,217,011 B2 | 2/2025 | Luo et al. |
| 12,223,549 B2 | 2/2025 | Bouëtté et al. |
| 12,229,690 B2 | 2/2025 | Stanevich et al. |
| 12,254,512 B2 | 3/2025 | Heglin et al. |
| 12,282,785 B2 | 4/2025 | Karbasi et al. |
| 12,288,236 B2 | 4/2025 | Volkovs et al. |
| 12,299,149 B2 | 5/2025 | Nikoghossian et al. |
| 12,316,715 B2 | 5/2025 | Taheri et al. |
| 12,321,861 B2 | 6/2025 | Volkovs et al. |
| 12,326,856 B2 | 6/2025 | Mohammed et al. |
| 12,333,354 B2 | 6/2025 | Mohammed et al. |
| 12,353,969 B2 | 7/2025 | Kuang et al. |
| 12,354,094 B2 | 7/2025 | Jones et al. |
| 12,373,795 B2 | 7/2025 | Misler et al. |
| 2007/0130505 A1* | 6/2007 | Woods .................. G06F 40/186 715/224 |
| 2007/0244761 A1* | 10/2007 | Scipioni .................. G06F 21/64 705/18 |
| 2010/0328225 A1* | 12/2010 | Black ...................... G06Q 10/10 726/16 |
| 2018/0268818 A1 | 9/2018 | Schoenmackers et al. |
| 2019/0172045 A1 | 6/2019 | Dunjic et al. |
| 2020/0058068 A1 | 2/2020 | Gandhi et al. |
| 2020/0366671 A1* | 11/2020 | Larson ................ H04L 63/0838 |
| 2021/0027160 A1 | 1/2021 | Volkovs et al. |
| 2021/0037040 A1 | 2/2021 | Aleks et al. |
| 2021/0117893 A1 | 4/2021 | Sohum et al. |
| 2021/0232950 A1 | 7/2021 | Kono |
| 2021/0264461 A1 | 8/2021 | Fam |
| 2021/0406398 A1* | 12/2021 | Brannon ................ G06F 21/552 |
| 2021/0407016 A1 | 12/2021 | Kuruvilla et al. |
| 2022/0058489 A1 | 2/2022 | Volkovs et al. |

(56) References Cited

U.S. PATENT DOCUMENTS

| | | |
|---|---|---|
| 2022/0108069 A1 | 4/2022 | Lee |
| 2022/0157094 A1 | 5/2022 | Moghtadai et al. |
| 2022/0172083 A1 | 6/2022 | Wu et al. |
| 2022/0188389 A1* | 6/2022 | Benkreira ............... G06F 21/40 |
| 2022/0188705 A1 | 6/2022 | Davoodi et al. |
| 2022/0198411 A1 | 6/2022 | Jones et al. |
| 2022/0198432 A1 | 6/2022 | Jones et al. |
| 2022/0198445 A1 | 6/2022 | Jones et al. |
| 2022/0207295 A1 | 6/2022 | Stanevich et al. |
| 2022/0207430 A1 | 6/2022 | Dickie et al. |
| 2022/0207432 A1 | 6/2022 | Whelan et al. |
| 2022/0207606 A1 | 6/2022 | Dickie et al. |
| 2022/0245060 A1 | 8/2022 | Kathuria et al. |
| 2022/0270155 A1 | 8/2022 | Volkovs et al. |
| 2022/0277213 A1 | 9/2022 | Braviner et al. |
| 2022/0277227 A1 | 9/2022 | Yu et al. |
| 2022/0277323 A1 | 9/2022 | Whelan et al. |
| 2022/0284450 A1 | 9/2022 | Asta et al. |
| 2022/0300903 A1 | 9/2022 | Huang et al. |
| 2022/0309573 A1 | 9/2022 | Mathew et al. |
| 2022/0318573 A1 | 10/2022 | Smith et al. |
| 2022/0318617 A1 | 10/2022 | Wong et al. |
| 2022/0327397 A1 | 10/2022 | Braviner et al. |
| 2022/0327430 A1 | 10/2022 | Zuberi et al. |
| 2022/0327431 A1 | 10/2022 | Braviner et al. |
| 2022/0327432 A1 | 10/2022 | Gutierrez Bugarin et al. |
| 2022/0327625 A1 | 10/2022 | Leung et al. |
| 2022/0335718 A1 | 10/2022 | Ma et al. |
| 2022/0343422 A1 | 10/2022 | Zuberi et al. |
| 2022/0366064 A1 | 11/2022 | Nikoghossian et al. |
| 2022/0383301 A1 | 12/2022 | Jones et al. |
| 2022/0383313 A1 | 12/2022 | Jones et al. |
| 2022/0383314 A1 | 12/2022 | Jones et al. |
| 2022/0405299 A1 | 12/2022 | Leung et al. |
| 2022/0414495 A1 | 12/2022 | Stanevich et al. |
| 2023/0006809 A1 | 1/2023 | Shpurov et al. |
| 2023/0007075 A1 | 1/2023 | Mcphee et al. |
| 2023/0011451 A1 | 1/2023 | Lu |
| 2023/0048437 A1 | 2/2023 | Karbasi et al. |
| 2023/0083899 A1 | 3/2023 | Gandouet et al. |
| 2023/0086653 A1 | 3/2023 | Zykh et al. |
| 2023/0107703 A1 | 4/2023 | Zhang et al. |
| 2023/0113752 A1 | 4/2023 | Jorlett et al. |
| 2023/0119108 A1 | 4/2023 | Volkovs et al. |
| 2023/0131935 A1 | 4/2023 | Volkovs et al. |
| 2023/0153461 A1 | 5/2023 | Kalra et al. |
| 2023/0195734 A1 | 6/2023 | Cashion et al. |
| 2023/0196406 A1 | 6/2023 | Gandouet et al. |
| 2023/0244917 A1 | 8/2023 | Loaiza Ganem et al. |
| 2023/0244962 A1 | 8/2023 | Volkovs et al. |
| 2023/0252301 A1 | 8/2023 | Volkovs et al. |
| 2023/0259883 A1 | 8/2023 | Misler et al. |
| 2023/0267367 A1 | 8/2023 | Volkovs et al. |
| 2023/0267475 A1 | 8/2023 | Navarro et al. |
| 2023/0281687 A1* | 9/2023 | Bhardwaj ............ G06Q 30/0609 705/26.35 |
| 2023/0306434 A1 | 9/2023 | Dunjic et al. |
| 2023/0316485 A1 | 10/2023 | Wakim et al. |
| 2023/0318994 A1 | 10/2023 | Moon et al. |
| 2023/0336615 A1 | 10/2023 | Joheb et al. |
| 2023/0342481 A1 | 10/2023 | Nikoghossian et al. |
| 2023/0344814 A1 | 10/2023 | Moon et al. |
| 2023/0351103 A1* | 11/2023 | Vedaraj ................ G06F 21/64 |
| 2023/0351116 A1 | 11/2023 | Skaljin et al. |
| 2023/0368048 A1 | 11/2023 | Yang et al. |
| 2023/0377047 A1 | 11/2023 | Bouëtté et al. |
| 2023/0385693 A1 | 11/2023 | Cresswell et al. |
| 2023/0385694 A1 | 11/2023 | Cresswell et al. |
| 2023/0386190 A1 | 11/2023 | Cresswell et al. |
| 2023/0394452 A1 | 12/2023 | Jones et al. |
| 2023/0401192 A1 | 12/2023 | Yang et al. |
| 2023/0401553 A1 | 12/2023 | Navarro et al. |
| 2023/0401572 A1 | 12/2023 | Navarro et al. |
| 2023/0419302 A1 | 12/2023 | Navarro et al. |
| 2023/0419402 A1 | 12/2023 | Ghelichi et al. |
| 2024/0020534 A1 | 1/2024 | Perez Vallejo et al. |
| 2024/0062117 A1 | 2/2024 | Kuang et al. |
| 2024/0106851 A1 | 3/2024 | Kennedy et al. |
| 2024/0119346 A1 | 4/2024 | Chang et al. |
| 2024/0126575 A1 | 4/2024 | Kiriakou et al. |
| 2024/0127036 A1 | 4/2024 | Zuberi et al. |
| 2024/0127214 A1 | 4/2024 | Wander et al. |
| 2024/0193562 A1 | 6/2024 | Pratten et al. |
| 2024/0202756 A1 | 6/2024 | Karl et al. |
| 2024/0203405 A1 | 6/2024 | McDermid et al. |
| 2024/0211732 A1 | 6/2024 | Wander et al. |
| 2024/0212049 A1 | 6/2024 | Ghelichi et al. |
| 2024/0220653 A1 | 7/2024 | D'Agostino |
| 2024/0232614 A1 | 7/2024 | Esmaeili et al. |
| 2024/0232950 A1 | 7/2024 | Navarro et al. |
| 2024/0249310 A1 | 7/2024 | Rai et al. |
| 2024/0256903 A1 | 8/2024 | Ens et al. |
| 2024/0256904 A1 | 8/2024 | Leung et al. |
| 2024/0256968 A1 | 8/2024 | Hosseinzadeh et al. |
| 2024/0265055 A1 | 8/2024 | Purkayastha |
| 2024/0281467 A1 | 8/2024 | Volkovs et al. |
| 2024/0281808 A1 | 8/2024 | Vouitsis et al. |
| 2024/0281818 A1 | 8/2024 | Golestan Irani et al. |
| 2024/0289645 A1 | 8/2024 | Makhijani et al. |
| 2024/0289876 A1 | 8/2024 | Mathew et al. |
| 2024/0303551 A1 | 9/2024 | Li et al. |
| 2024/0304182 A1 | 9/2024 | Hamilton et al. |
| 2024/0330772 A1 | 10/2024 | Cresswell et al. |
| 2024/0330809 A1 | 10/2024 | Carvalho et al. |
| 2024/0338520 A1 | 10/2024 | Misler et al. |
| 2024/0346338 A1 | 10/2024 | Desai et al. |
| 2024/0370880 A1 | 11/2024 | Jeske et al. |
| 2024/0370881 A1 | 11/2024 | Jeske et al. |
| 2024/0385838 A1 | 11/2024 | Yu et al. |
| 2024/0386295 A1 | 11/2024 | Yu et al. |
| 2024/0386325 A1 | 11/2024 | Yu et al. |
| 2024/0386326 A1 | 11/2024 | Yu et al. |
| 2024/0386427 A1 | 11/2024 | Abbas et al. |
| 2024/0394569 A1 | 11/2024 | Farhadi Hassan Kiadeh et al. |
| 2024/0394588 A1 | 11/2024 | Heglan et al. |
| 2024/0403702 A1 | 12/2024 | Deljavan Farshi |
| 2024/0403862 A1 | 12/2024 | Abbas et al. |
| 2024/0412069 A1 | 12/2024 | Volkovs et al. |
| 2024/0412078 A1 | 12/2024 | Ghelichi et al. |
| 2024/0412083 A1 | 12/2024 | Starszyk et al. |
| 2024/0419978 A1 | 12/2024 | Stein et al. |
| 2024/0420010 A1 | 12/2024 | Cirulis et al. |
| 2024/0420011 A1 | 12/2024 | Cirulis et al. |
| 2024/0428283 A1 | 12/2024 | Belbahri et al. |
| 2025/0013363 A1 | 1/2025 | Estoesta et al. |
| 2025/0013697 A1 | 1/2025 | Estoesta et al. |
| 2025/0013927 A1 | 1/2025 | Rho et al. |
| 2025/0014010 A1 | 1/2025 | Jones et al. |
| 2025/0014052 A1 | 1/2025 | Bhattacharjee et al. |
| 2025/0028852 A1 | 1/2025 | Chowanski et al. |
| 2025/0028934 A1 | 1/2025 | Wong et al. |
| 2025/0029012 A1 | 1/2025 | Rho et al. |
| 2025/0045621 A1 | 2/2025 | Zuberi et al. |
| 2025/0053387 A1 | 2/2025 | Wang et al. |
| 2025/0068646 A1 | 2/2025 | Rahman et al. |
| 2025/0068853 A1 | 2/2025 | Lu |
| 2025/0069063 A1 | 2/2025 | Navarro et al. |
| 2025/0077187 A1 | 3/2025 | Guttridge et al. |
| 2025/0077188 A1 | 3/2025 | Guttridge et al. |
| 2025/0077189 A1 | 3/2025 | Guttridge et al. |
| 2025/0077190 A1 | 3/2025 | Guttridge et al. |
| 2025/0077204 A1 | 3/2025 | Guttridge et al. |
| 2025/0077227 A1 | 3/2025 | Guttridge et al. |
| 2025/0077396 A1 | 3/2025 | Sen |
| 2025/0077397 A1 | 3/2025 | Sen |
| 2025/0077399 A1 | 3/2025 | Sen |
| 2025/0077400 A1 | 3/2025 | Sen |
| 2025/0077556 A1 | 3/2025 | Guttridge et al. |
| 2025/0077681 A1 | 3/2025 | Sen |
| 2025/0077682 A1 | 3/2025 | Guttridge et al. |
| 2025/0077939 A1 | 3/2025 | Tabatabaei et al. |
| 2025/0078324 A1 | 3/2025 | Gormley |
| 2025/0078325 A1 | 3/2025 | Gormley |
| 2025/0078344 A1 | 3/2025 | Gormley |

(56) References Cited

U.S. PATENT DOCUMENTS

| | | |
|---|---|---|
| 2025/0078345 A1 | 3/2025 | Gormley |
| 2025/0078972 A1 | 3/2025 | Gormley |
| 2025/0085936 A1 | 3/2025 | Guttridge et al. |
| 2025/0086096 A1 | 3/2025 | Guttridge et al. |
| 2025/0086440 A1 | 3/2025 | Erb et al. |
| 2025/0086441 A1 | 3/2025 | Guttridge et al. |
| 2025/0086451 A1 | 3/2025 | Guttridge et al. |
| 2025/0086551 A1 | 3/2025 | Zhao |
| 2025/0094437 A1 | 3/2025 | Upendran |
| 2025/0103609 A1 | 3/2025 | Upendran |
| 2025/0103961 A1 | 3/2025 | Cresswell et al. |
| 2025/0103980 A1 | 3/2025 | Deljavan Farshi et al. |
| 2025/0104024 A1 | 3/2025 | Abbas |
| 2025/0104029 A1 | 3/2025 | Deljavan Farshi et al. |
| 2025/0104047 A1 | 3/2025 | Mashkevich |
| 2025/0104050 A1 | 3/2025 | Mashkevich |
| 2025/0104059 A1 | 3/2025 | Mashkevich |
| 2025/0104074 A1 | 3/2025 | Tsang et al. |
| 2025/0104306 A1 | 3/2025 | Mashkevich |
| 2025/0104700 A1 | 3/2025 | Henault-Ethier et al. |
| 2025/0106060 A1 | 3/2025 | Gormley et al. |
| 2025/0106201 A1 | 3/2025 | Gormley |
| 2025/0110805 A1 | 4/2025 | Starszyk et al. |
| 2025/0117411 A1 | 4/2025 | Mohammed |
| 2025/0117595 A1 | 4/2025 | Taheri |
| 2025/0117596 A1 | 4/2025 | Taheri |
| 2025/0117623 A1 | 4/2025 | Devarajan et al. |
| 2025/0117629 A1 | 4/2025 | Pandey et al. |
| 2025/0117630 A1 | 4/2025 | Taheri |
| 2025/0117769 A1 | 4/2025 | Taheri |
| 2025/0117836 A1 | 4/2025 | Taheri et al. |
| 2025/0117853 A1 | 4/2025 | Pandey et al. |
| 2025/0117854 A1 | 4/2025 | Pandey et al. |
| 2025/0117855 A1 | 4/2025 | Pandey et al. |
| 2025/0117856 A1 | 4/2025 | Pandey et al. |
| 2025/0119396 A1 | 4/2025 | Taheri |
| 2025/0119494 A1 | 4/2025 | Pandey et al. |
| 2025/0119495 A1 | 4/2025 | Pandey et al. |
| 2025/0124039 A1 | 4/2025 | Cashion et al. |
| 2025/0124240 A1 | 4/2025 | Luo et al. |
| 2025/0131718 A1 | 4/2025 | Ma et al. |
| 2025/0138838 A1 | 5/2025 | Ramesh et al. |
| 2025/0139267 A1 | 5/2025 | Zykh et al. |
| 2025/0139382 A1 | 5/2025 | Mohammed et al. |
| 2025/0139708 A1 | 5/2025 | Bouëtté et al. |
| 2025/0147733 A1 | 5/2025 | Abbas et al. |
| 2025/0148321 A1 | 5/2025 | Stanevich et al. |
| 2025/0165375 A1 | 5/2025 | Cresswell et al. |
| 2025/0165866 A1 | 5/2025 | Cresswell et al. |
| 2025/0173170 A1 | 5/2025 | Glynn-Udrow et al. |
| 2025/0173568 A1 | 5/2025 | Cresswell et al. |
| 2025/0173618 A1 | 5/2025 | Cresswell et al. |
| 2025/0173619 A1 | 5/2025 | Cresswell et al. |
| 2025/0173725 A1 | 5/2025 | Devarajan et al. |
| 2025/0181321 A1 | 6/2025 | Gormley |
| 2025/0182028 A1 | 6/2025 | Gormley |
| 2025/0182196 A1 | 6/2025 | Gormley |
| 2025/0182222 A1 | 6/2025 | Gormley |
| 2025/0191062 A1 | 6/2025 | Heglin et al. |
| 2025/0203009 A1* | 6/2025 | Sundar ................. G06F 16/951 |
| 2025/0217175 A1 | 7/2025 | Karbasi et al. |
| 2025/0225560 A1 | 7/2025 | Bajaj et al. |
| 2025/0231668 A1 | 7/2025 | Tao et al. |
| 2025/0231750 A1 | 7/2025 | Lim et al. |
| 2025/0231774 A1 | 7/2025 | Tao et al. |
| 2025/0231775 A1 | 7/2025 | Tao et al. |
| 2025/0231793 A1 | 7/2025 | Lim et al. |
| 2025/0232130 A1 | 7/2025 | Tao et al. |
| 2025/0232351 A1 | 7/2025 | Tao et al. |
| 2025/0232375 A1 | 7/2025 | Tao et al. |
| 2025/0232376 A1 | 7/2025 | Tao et al. |
| 2025/0232377 A1 | 7/2025 | Tao et al. |
| 2025/0232503 A1 | 7/2025 | Lim et al. |
| 2025/0238536 A1 | 7/2025 | Nikoghossian et al. |
| 2025/0245071 A1 | 7/2025 | Ionescu et al. |
| 2025/0245511 A1 | 7/2025 | D'Agostino et al. |
| 2025/0252252 A1* | 8/2025 | Shetty ................. G06K 7/1417 |

* cited by examiner

PARALLEL ARTIFICIAL INTELLIGENCE DRIVEN IDENTITY CHECKING WITH BIOMETRIC PROMPTING

BACKGROUND

Online application forms (applications) are used by users to sign up for products and services. For example, an application form may be accessed by visiting a publicly available website or through a mobile device software application that can be downloaded and installed from a digital distribution platform. The application form may include fields, boxes, drop-down menus, upload sections, and other graphical elements that a user can manipulate through a user interface thereby adding content to the application form. Accordingly, the user may enter personal information, educational history, work history, skills, qualifications, provide answers to questions, and the like. The user may then select a button or other graphical element within the application form to submit the application form to a host server for further processing.

SUMMARY

One example embodiment provides an apparatus that includes a memory communicably coupled to a processor, wherein the processor may one or more of receive application data via at least one data prompt on an application form on a computing device, receive device data from the computing device, execute a trained artificial intelligence (AI) model to predict a data validity risk level based on the application data and the device data, determine at least one identity check to be performed based on the predicted data validity risk level, determine at least one additional data prompt needed to execute the at least one identity check, analyze the application data being received, augment the application form on the computing device with the at least one additional data prompt based on the analyzed application data, wherein the at least one additional data prompt requests biometric data, wherein a type of biometric data is based on an amount the predicted data validity risk level is above a threshold, receive additional application data based on the at least one additional data prompt on the computing device, and execute the at least one identity check based on the received additional application data.

Another example embodiment provides a method that includes one or more of receiving application data via at least one data prompt on an application form on a computing device, receiving device data from the computing device, executing a trained artificial intelligence (AI) model to predict a data validity risk level based on the application data and the device data, determining at least one identity check to be performed based on the predicted data validity risk level, determining at least one additional data prompt needed to execute the at least one identity check, analyzing the application data being received, augmenting the application form on the computing device with the at least one additional data prompt based on the analyzed application data, wherein the at least one additional data prompt requests biometric data, wherein a type of biometric data is based on an amount the predicted data validity risk level is above a threshold, receiving additional application data based on the at least one additional data prompt on the computing device, and executing the at least one identity check based on the received additional application data.

A further example embodiment provides a computer readable storage medium comprising instructions, that when read by a processor, cause the processor to perform one or more of receiving application data via at least one data prompt on an application form on a computing device, receiving device data from the computing device, executing a trained artificial intelligence (AI) model to predict a data validity risk level based on the application data and the device data, determining at least one identity check to be performed based on the predicted data validity risk level, determining at least one additional data prompt needed to execute the at least one identity check, analyzing the application data being received, augmenting the application form on the computing device with the at least one additional data prompt based on the analyzed application data, wherein the at least one additional data prompt requests biometric data, wherein a type of biometric data is based on an amount the predicted data validity risk level is above a threshold, receiving additional application data based on the at least one additional data prompt on the computing device, and executing the at least one identity check based on the received additional application data.

DETAILED DESCRIPTION

It is to be understood that although this disclosure includes a detailed description of cloud computing, implementation of the instant solution recited herein is not limited to a cloud computing environment. Rather, the instant solution is capable of being implemented in conjunction with any other type of computing environment now known or later developed.

During a typical online application process, a user inputs content into forms, fields, etc., of the application. Meanwhile, security checks are not performed on the filled-in content until the application is completed and submitted in its entirety to a host server. The benefit of this process is that the security checks are performed on a completed application. However, by waiting to perform the security checks until the application is completed, the host server is unable to identify security concerns which may be corrected or addressed before the application is submitted. Moreover, when a security concern, such as an issue with an identity check, is detected during subsequent processing of the application, the application is typically halted/suspended from further processing until a person from the organization can review the application and communicate with the applicant to obtain more information.

The examples and features of the instant solution are directed to a host platform that can automate one or more security checks on a partially completed application form that is currently being filled in by a user. For example, the host platform may detect a security concern based on content within the partially completed application and automatically starts processing one or more security checks (e.g., identity verification, background checks, credit checks, etc.) on content entered into the application before the user has completed the application. Furthermore, rather than prevent the user from completing the application (i.e., suspending the application process), the host platform may dynamically augment the application form with additional data prompts, allowing the user to continue to fill in the application without the user being aware that the application form is being augmented with additional data prompts to collect additional application data that is needed for the identity checks.

The application may include checkpoints therein which are used by the host platform to verify the content within the application form up to the checkpoint. For example, the application form may include multiple pages. After each page there may be a checkpoint that causes the host platform to run a check on the data entered by the user. The host platform may perform a screen capture of the content that has been entered into the partially completed application and compare the content from the partially completed application form to verification data that is held by the host platform and/or accessed from one or more external data sources and the like, such as publicly available data sources.

Figure 1:
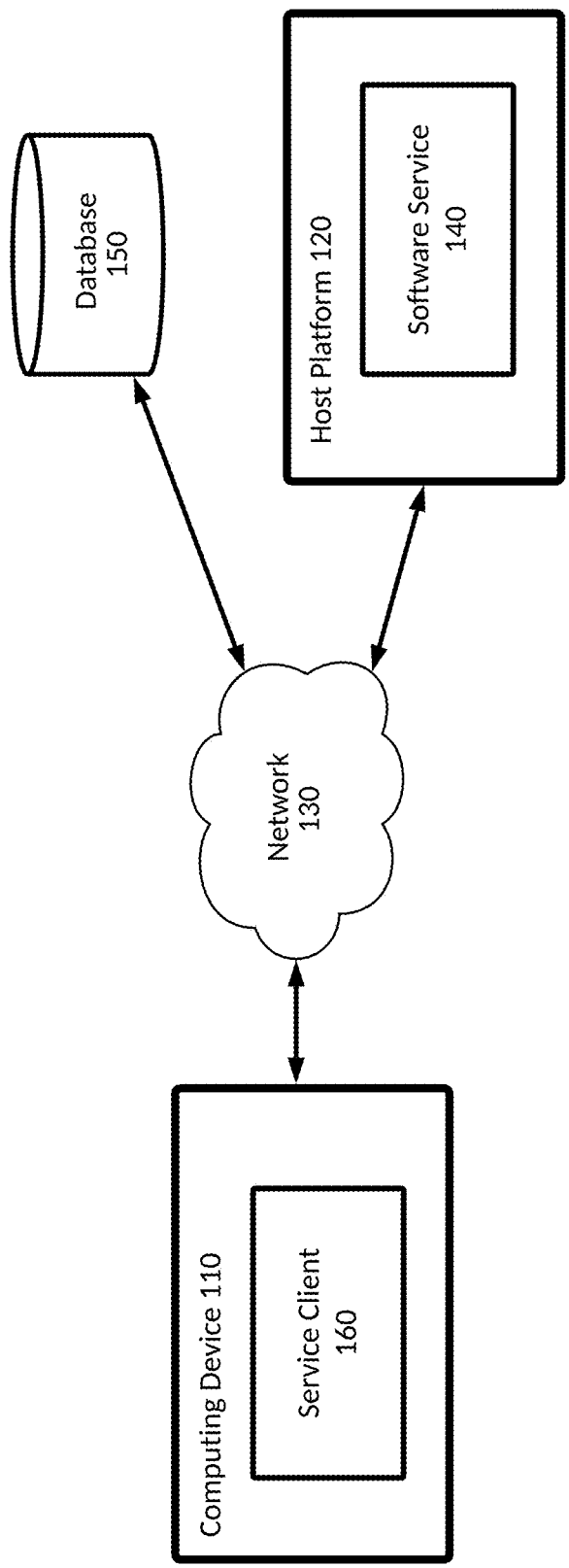
FIG. 1 is a system diagram illustrating an operating environment of a software service according to examples and features of the instant solution.

FIG. 1 is a system diagram illustrating an example operating environment of the instant solution. As shown, one or more computing devices 110, and a host platform 120 communicate via a network 130. The host platform 120 may host a software service 140. The software service 140 may communicate with one or more databases 150 through a network 130 during the course of service execution. Each computing device 110 may host a service client 160, which communicates with a corresponding software service 140.

A computing device 110 may be a mobile phone, tablet, laptop computer, desktop computer, smartwatch, vehicle infotainment system, or any computing device including a processor and memory. The host platform 120 may include a single physical server, multiple physical servers, a cloud hosting environment, or a hybrid hosting environment in which some components of the host platform 120 are "on-premise" while others are cloud-hosted. The network 130 is a computer network and may include one or more interconnected computer networks. For example, network 130 may be or may include an Ethernet network, an asynchronous transfer mode (ATM) network, a wireless network, a telecommunications network, or the like.

The software service 140 provides the service logic. It may provide one or more Application Programming Interfaces (APIs) for communicating with one or more service clients 160. A "thick" user interface client that runs on a computing device 110 may utilize the APIs to communicate with the software service 140. Further, the software service 140 may provide hosted User Interfaces (UIs) that can be accessed through browser-based software on some computing devices 110.

The one or more service clients 160 can enable service access for end users and may come in a variety of forms including, but not limited to, a mobile device application ("app") or a web portal accessed via a browser on a computing device 110 such as a laptop or desktop computer.

Detailed descriptions of the architecture and operation of the product application service in the instant solution are further described and depicted herein.

Figure 2A:
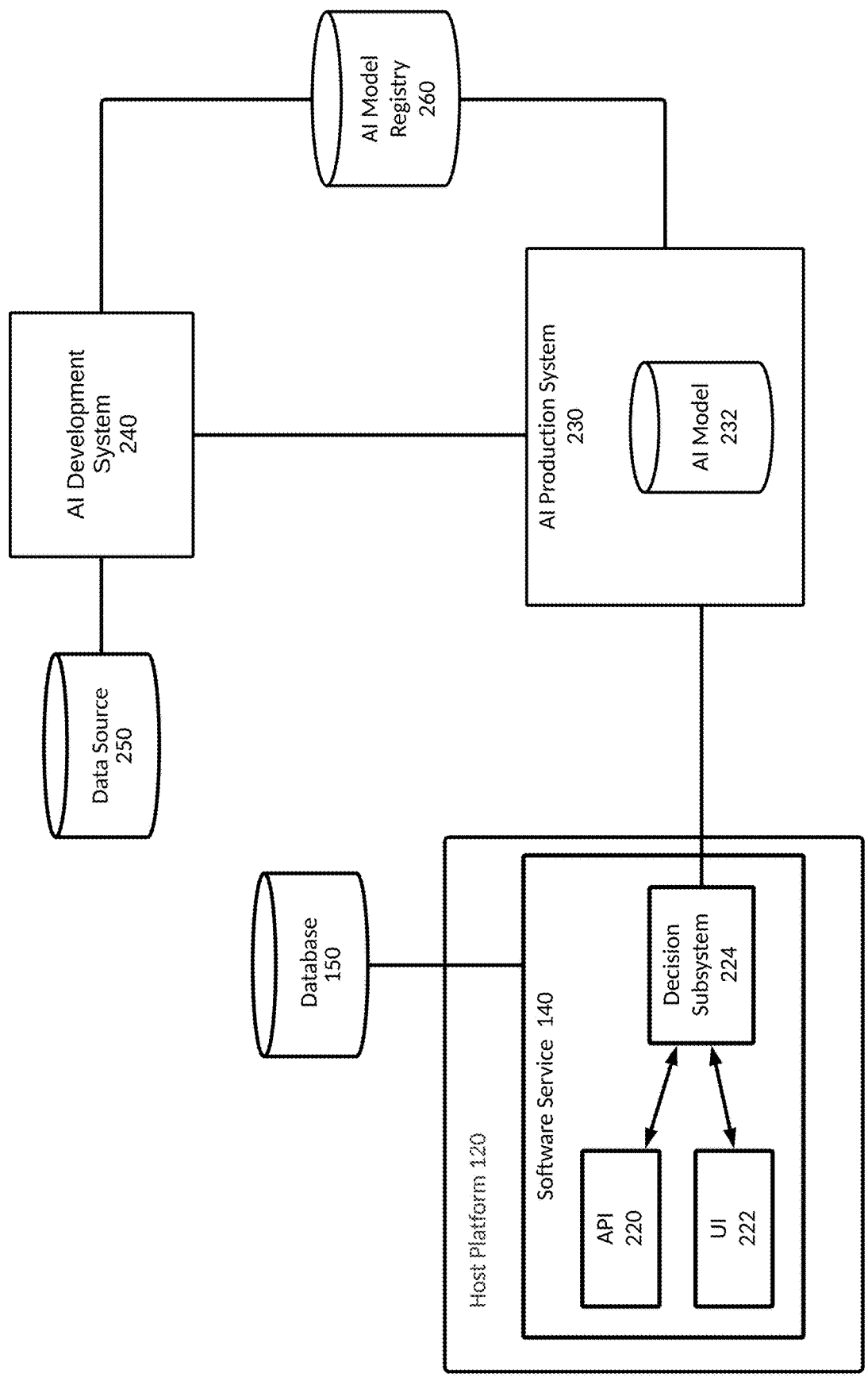
FIG. 2A is a system diagram illustrating integration of an AI model into any decision point according to the examples and features of the instant solution.

FIG. 2A illustrates an artificial intelligence (AI) network diagram 200A that supports AI-assisted decision points in a software service executing on a computer. While the example instant solution shown utilizes a neural network, which is a type of machine learning (ML) model, other branches of AI, such as, but not limited to, computer vision, fuzzy logic, expert systems, deep learning, generative AI, and natural language processing, may be employed in developing the AI model in this instant solution. Further, the AI model included in these examples and features of the instant solution is not limited to particular AI algorithms. Any algorithm or combination of algorithms related to supervised, unsupervised, and reinforcement learning may be employed.

The AI models, ML models, neural networks, and other branches of AI, described and/or depicted herein, build upon the fundamentals of predecessor technologies and form the foundation for all future technological advancements in artificial intelligence. An AI classification system describes the stages of AI progression and advancement. The first classification is known as "reactive machines," followed by present-day AI classification "limited memory machines" (also known as "artificial narrow intelligence"), then progressing to "theory of mind" (also known as "artificial general intelligence") and reaching the AI classification "self-aware" (also known as "artificial superintelligence"). Present-day limited memory machines are a growing group of AI models built upon the foundation of their predecessors, reactive machines. Reactive machines emulate human responses to stimuli; however, they are limited in their capabilities as they cannot typically learn from prior experience. Once the AI model's learning abilities emerged, its classification was promoted to limited memory machines. In this present-day classification, AI models learn from large volumes of data, detect patterns, solve problems, generate, and predict data, and the like, while inheriting all the capabilities of reactive machines.

Examples of AI models classified as limited memory machines include, but are not limited to, chatbots, virtual assistants, machine learning, neural networks, deep learning, natural language processing, generative AI models, and any future AI models that are yet to be developed possessing characteristics of limited memory machines.

For example, a neural network is a type of machine learning model that relies on training data to learn associations and connections, improving its accuracy for performing high speed data classifications, clustering, and other analyses of data. Such neural network capabilities are the foundation of deep learning models today as well as becoming the foundational blocks of those yet to be developed.

For example, generative AI models combine limited memory machine technologies, incorporating machine learning and deep learning, forming the foundational building blocks of future AI models. For example, theory of mind is the next progression of AI that may be able to perceive, connect, and react by generating appropriate reactions in response to an entity with which the AI model is interacting; all these theory of mind capabilities relies on the fundamentals of generative AI. Furthermore, in an evolution into the self-aware classification, AI models will be able to understand and evoke emotions in the entities they interact with, as well as possessing their own emotions, beliefs, and needs, all of which rely on generative AI fundamentals of learning from experiences to generate and draw conclusions about itself and its surroundings.

AI models may include, but are not limited to, at least one machine learning model, neural network model, deep learning model, generative AI model, or any combination of models from the branches of AI. AI models are integral and core to future artificial intelligence models. As described herein, AI model refers to present-day AI models and future AI models.

Software service 140 (see FIGS. 1, 2A), executing on host platform 120 (see FIGS. 1, 2A) may provide one or more application programming interfaces (APIs) 220 that enable interaction with other software components via a set of data definitions and protocols. In some examples and features of the instant solution, the APIs provided may employ Simple Object Access Protocol (SOAP), Remote Procedure Calls (RPC), and Representational State Transfer (REST) techniques. In some examples and features of the instant solution, the plurality of APIs 220 send data to one or more decision subsystems 224 of the software service 140 to assist in decision-making. In some examples and features of the instant solution, the software service 140 stores data included in API requests or data generated during processing the API requests into one or more databases 150 (see FIGS. 1, 2A).

Software service 140 may provide one or more user interfaces (UIs) 222, such as a server-side hosted graphical user interface (GUI). In some examples and features of the instant solution, the UIs 222 provided employ template-based frameworks, component-based frameworks, etc. In some examples and features of the instant solution, these UIs 222 send data to one or more decision subsystems 224 of the software service 140 to assist with decision-making. In some examples and features of the instant solution, the software service 140 stores data included in UI requests or data generated during processing the UI requests into one or more databases 150.

Software service 140 may include one or more decision subsystems 224 that drive a decision-making process of the software service 140. In some examples and features of the instant solution, the decision subsystems 224 receive data from one or more APIs 220 as input into the decision-making process. In some examples and features of the instant solution, a decision subsystem 224 may receive data from one or more UIs 222 as input to the decision-making process. A decision subsystem 224 may gather service configuration or historical execution data from one or more databases 150 to aid in the decision-making process. A decision subsystem 224 may provide feedback to an API 220 or a UI 222.

An AI production system 230 may be used by a decision subsystem 224 in a software service 140 to assist in its decision-making process. The AI production system 230 includes one or more AI models 232 that are executed to generate a response, such as, but not limited to, a prediction, a categorization, a UI prompt, etc. In some examples and features of the instant solution, an AI production system 230 is hosted on a server. In some examples and features of the instant solution, the AI production system 230 is cloud-hosted. In some examples and features of the instant solution, the AI production system 230 is deployed in a distributed multi-node architecture.

An AI development system 240 creates one or more AI models 232. In some examples and features of the instant solution, the AI development system 240 utilizes data from one or more data sources 250 to develop and train one or more AI models 232. The data sources 250 may be local or third-party data sources. Further, the data provided by the data sources may be real-world or synthetic. In some examples and features of the instant solution, the AI development system 240 utilizes execution feedback data from one or more AI production systems 230 for new model development and/or existing model re-training. In some examples and features of the instant solution, the AI development system 240 resides and executes on a server. In some examples and features of the instant solution, the AI development system 240 is cloud hosted. In some examples and features of the instant solution, the AI development system 240 is deployed in a distributed multi-node architecture. In some examples and features of the instant solution, the AI development system 240 utilizes a distributed data pipeline/analytics engine.

Once an AI model 232 has been trained and validated in the AI development system 240, it may be stored in an AI model registry 260 for retrieval by either the AI development system 240 or by one or more AI production systems 230. The AI model registry 260 resides in a dedicated server in one example of the instant solution. In some examples and features of the instant solution, the AI model registry 260 is cloud-hosted. In some examples and features of the instant solution, the AI model registry 260 resides in the AI production system 230. In some examples and features of the instant solution, the AI model registry 260 is a distributed database.

Figure 2B:
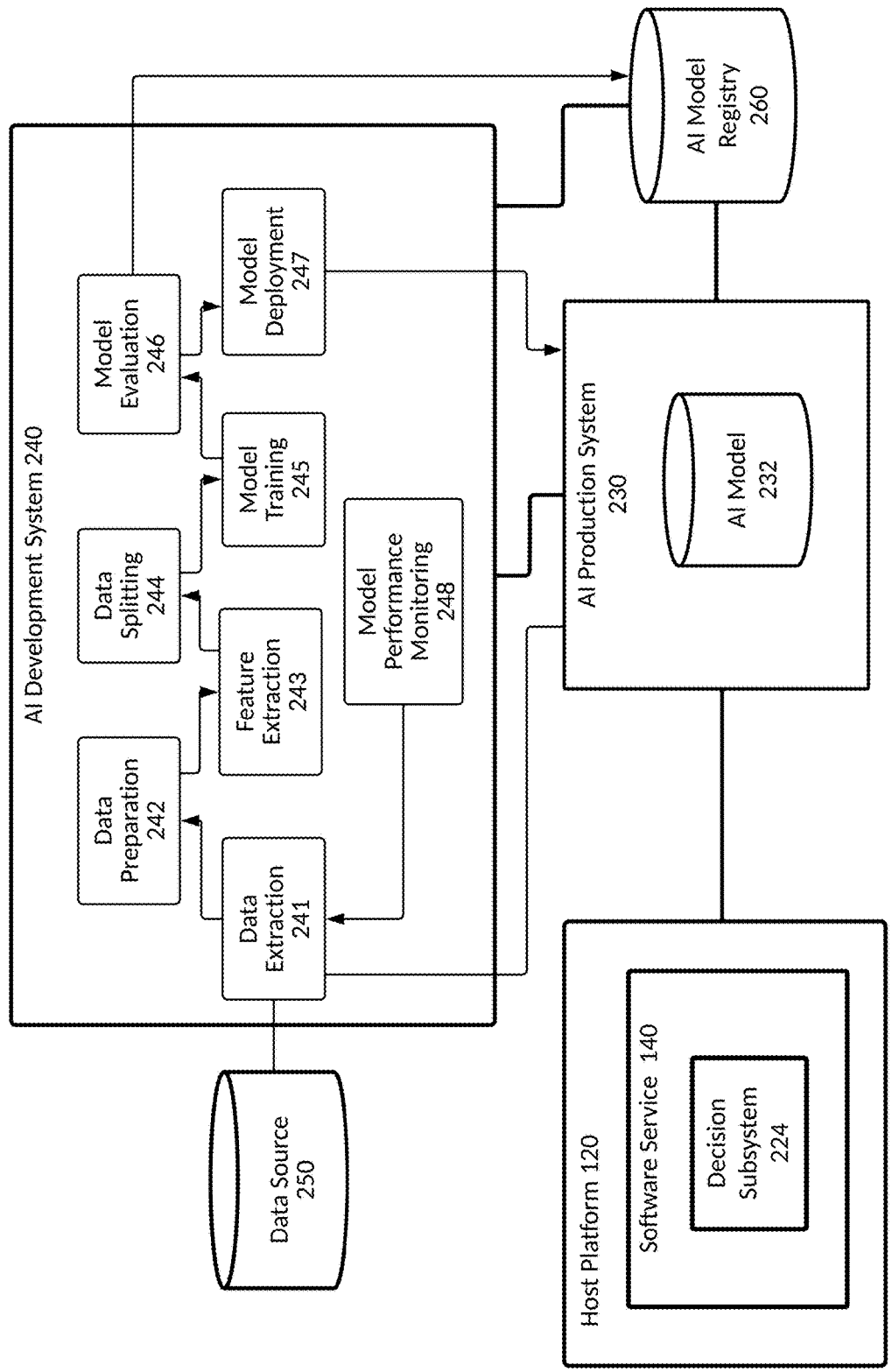
FIG. 2B is a diagram illustrating a process for developing an AI model that supports AI-assisted computer decision points according to the examples and features of the instant solution.

FIG. 2B illustrates a process 200B for developing one or more AI models that support AI-assisted decision points. An AI development system 240 executes steps to develop an AI model 232 that begins with data extraction 241, in which data is loaded and ingested from one or more data sources 250. In some examples and features of the instant solution, historical model feedback data is extracted from one or more AI production systems 230.

Once the data has been extracted during data extraction 241, it undergoes data preparation 242 for model training. In some examples and features of the instant solution, this step involves statistical testing of the data to see how well it reflects real-world events, its distribution, the variety of data in the dataset, etc., and the results of this statistical testing may lead to one or more data transformations being employed to normalize one or more values in the dataset. In some examples and features of the instant solution, data deemed to be noisy is cleaned. A noisy dataset includes values that do not contribute to the training, such as, but not limited to, null and long string values. Data preparation 242 may be a manual process or an automated process using one or more of the elements and/or functions described and/or depicted herein.

Features of the data are identified and extracted during the feature extraction step 243. In some examples and features of the instant solution, a feature of the data is internal to the prepared data from the data preparation step 242. In some examples and features of the instant solution, a feature of the data requires a piece of prepared data from the data preparation step 242 to be enriched by data from another data source to be useful in developing the AI model 232. In some examples and features of the instant solution, identifying features may be a manual process or an automated process using one or more of the elements and/or functions described and/or depicted herein. Once the features have been identified, the values of the features are collected into a dataset that will be used to develop the AI model 232.

The dataset output from the feature extraction step 243 is split 244 into a training and validation data set. The training data set is used to train the AI model 232, and the validation data set is used to evaluate the performance of the AI model 232 on unseen data.

The AI model 232 is trained and tuned 245 using the training data set from the data splitting step 244. In this step, the training data set is provided to an AI algorithm and an initial set of algorithm parameters. The performance of the AI model 232 is then tested within the AI development system 240 utilizing the validation data set from step 244. These steps may be repeated with adjustments to one or more algorithm parameters until the model's performance is acceptable based on various goals and/or results.

The AI model 232 is evaluated 246 in a staging environment (not shown) that resembles the target AI production system 230. This evaluation uses a validation dataset to ensure the performance in an AI production system 230 matches or exceeds expectations. In some examples and features of the instant solution, the validation dataset from step 244 is used. In some examples and features of the instant solution, one or more unseen validation datasets are used. In some examples and features of the instant solution, the staging environment is part of the AI development system 240, and the staging environment is managed separately from the AI development system 240. Once the AI model 232 has been validated, it is stored in an AI model registry 260, where it can be retrieved for deployment and future updates. In some examples and features of the instant solution, the model evaluation step 246 may be a manual process or an automated process using one or more of the elements and/or functions described and/or depicted herein.

In some examples and features of the instant solution, the AI development system includes a user interface (not shown). The user interface may be used to manage the development system infrastructure, the steps 241-248 within the development system, the interim data transmitted between the various steps 241-248, and the data sources 250.

Once an AI model 232 has been validated and published to an AI model registry 260, it may be deployed during the model deployment step 247 to one or more AI production systems 230. In some examples and features of the instant solution, the performance of deployed AI model 232 is monitored 248 by the AI development system 240. In some examples and features of the instant solution, AI model 232 feedback data is provided by the AI production system 230 to enable model performance monitoring 248, and the AI development system 240 periodically requests feedback data for model performance monitoring 248, which includes one or more triggers that result in the AI model 232 being updated by repeating steps 241-248 with updated data from one or more data sources 250.

Figure 2C:
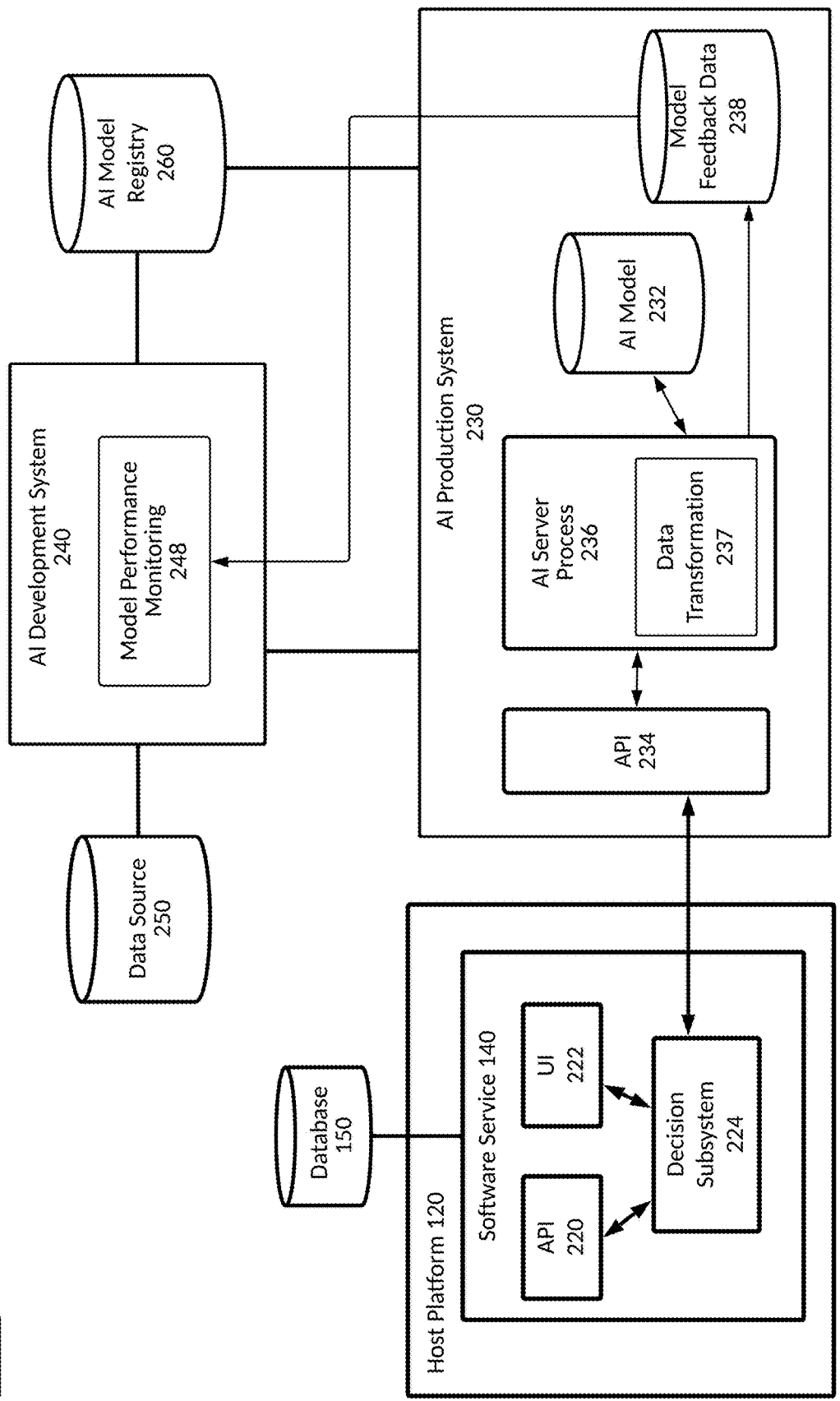
FIG. 2C is a diagram illustrating a process for utilizing an AI model that supports AI-assisted computer decision points according to examples and features of the instant solution.

FIG. 2C illustrates a process 200C for utilizing an AI model that supports AI-assisted decision points. As stated previously, the AI model utilization process depicted herein reflects ML, which is a particular branch of AI, but this instant solution is not limited to ML and is not limited to any AI algorithm or combination of algorithms.

Referring to FIG. 2C, an AI production system 230 may be used by a decision subsystem 224 in software service 140 to assist in its decision-making process. The AI production system 230 provides an API 234, executed by an AI server process 236 through which requests can be made. In some examples and features of the instant solution, a request may include an AI model 232 identifier to be executed based on the type of request. In some examples and features of the instant solution, a data payload (e.g., to be input to the AI model during execution) is included in the request. The data payload may include API 220 data from software service 140, UI 222 data from software service 140 or data from other software service 140 subsystems (not shown).

Upon receiving the API 234 request, the AI server process 236 may transform 237 the data payload or portions of the data payload to be valid feature values in an AI model 232. Data transformation 237 may include, but is not limited to, combining data values, normalizing data values, and enriching the incoming data with data from other data sources 250. Once the data transformation occurs, the AI server process 236 executes the appropriate AI model 232 using the transformed input data. Upon receiving the execution result, the AI server process 236 responds to the API requester, which is a decision subsystem 224 of software service 140. In some examples and features of the instant solution, the response may result in an update to a UI 222 in software service 140. In some examples and features of the instant solution, the response includes a request identifier that can be used later by the software service 140 to provide feedback on the performance of the AI model 232. In some examples and features of the instant solution, a model feedback record may be added into a model feedback data 238 by the AI server process 236.

In some examples and features of the instant solution, the API 234 includes an interface to provide AI model 232 feedback after an AI model 232 execution response has been processed. This mechanism enables the requester to provide feedback on the accuracy of the AI model 232 results. In some examples and features of the instant solution, the feedback interface includes the identifier of the initial request so that it can be used to associate the feedback with the request. Upon receiving a call into the feedback interface of the API 234, the AI server process 236 creates and adds a model feedback record into the model feedback data 238 which holds historical model feedback records. In some examples and features of the instant solution, the records in this model feedback data 238 are provided to model performance monitoring 248 in the AI development system 240. This model feedback data is streamed to the AI development system 240 or may be provided upon request. In some examples and features of the instant solution, the model feedback records in the model feedback data 238 are used as an input for retraining the AI model 232.

In some examples and features of the instant solution, the AI production system 230 includes a user interface (not shown). The user interface may be used to manage the production system infrastructure, the components of the production system 230-238, and the operation of the AI production system and its components.

Figure 3A:
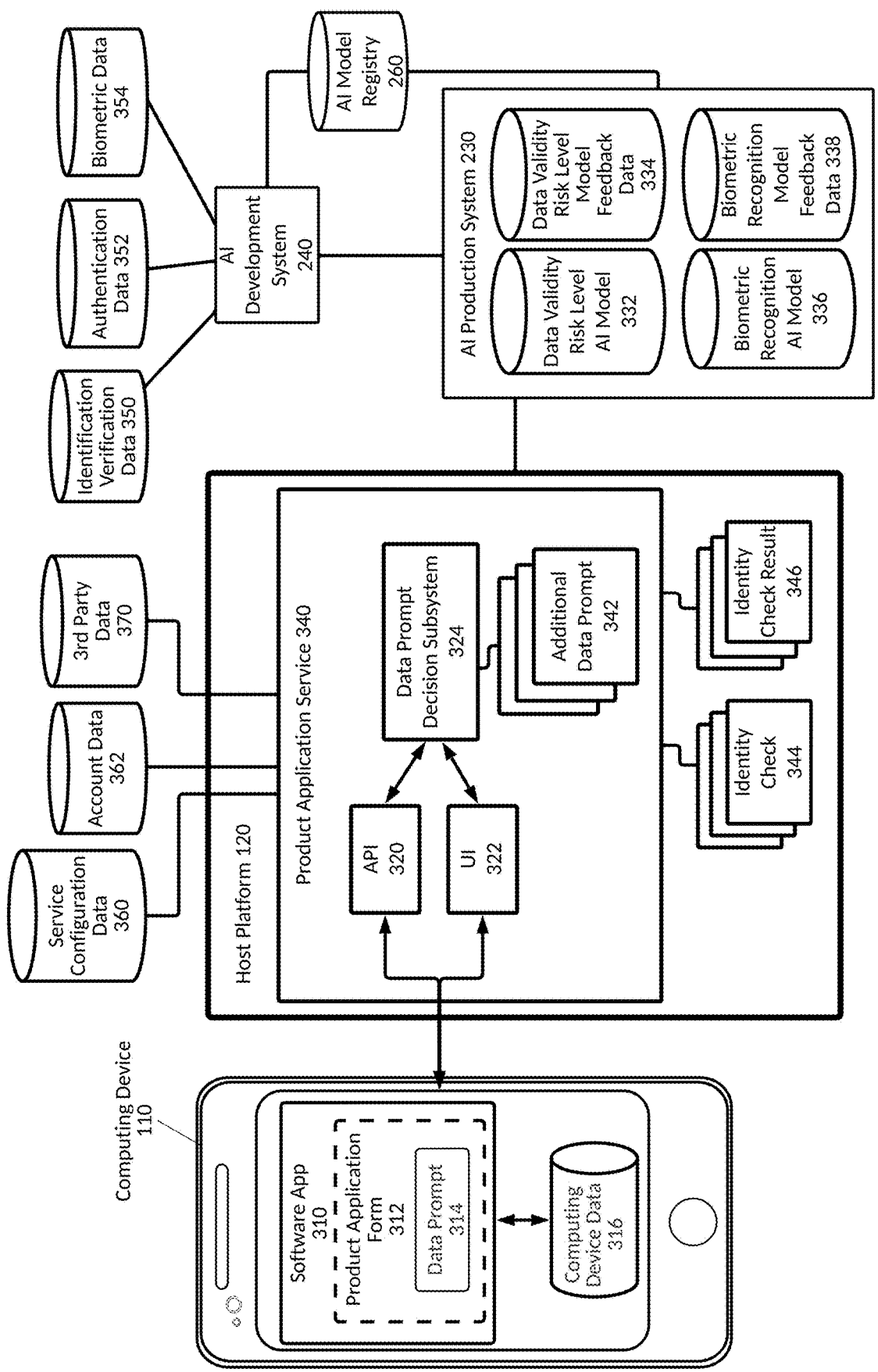
FIG. 3A is a system diagram illustrating an operating environment for a product application service that identifies and creates at least one additional prompt to collect additional application data, such as biometric data, when processing at least one needed identity check for a product application form, according to examples and features of the instant solution.

FIG. 3A is a system diagram illustrating an operating environment 300A for an operating environment for a product application service that identifies and creates at least one additional prompt to collect additional application data, such as biometric data, when processing at least one needed identity check for a product application form, according to examples and features of the instant solution. In operating environment 300A, a data validity risk level AI model 332 and a biometric recognition AI model 336 are trained, respectively, to predict a data validity risk level and to verify a biometric identity given applicant data from a product application form and device data from a computing device.

In some examples and features of the instant solution, a data validity risk level AI model 332 is trained using identity verification data 350, authentication data 352 (such as historical customer authentication data), and data validity risk level model feedback data 334 to predict data validity risk levels, given a set of feature data transformed from a set of product application data and computing device data. In some examples and features of the instant solution, a biometric recognition AI model 336 is trained using identity verification data 350, authentication data 352 (such as historical customer authentication data), biometric data 354, and biometric recognition model feedback data 338 to verify an applicant's biometric identity, given a set of feature data transformed from a set of product application data and computing device data. The data validity risk level AI model 332 and the biometric recognition AI model 336 are examples of AI model 232 (see, for example, FIGS. 2A-2C). The identity verification data 350, the authentication data 352, and the biometric data 354 are examples of data source 250 (see, for example, FIGS. 2A-2C). The data validity risk level model feedback data 334 and biometric recognition model feedback data 338 are examples of model feedback data 238 (see, for example, FIG. 2C), and data validity risk level model feedback record and biometric recognition model feedback record are examples of model feedback record.

In some examples and features of the instant solution, the data validity risk level AI model 332 and the biometric recognition AI model 336 are trained using a neural network training method and/or capability, such as, but not limited to, gradient descent, stochastic gradient descent, random search, uniform search, basin hopping, or Krylov. In some examples and features of the instant solution, the data validity risk level AI model 332 and the biometric recognition AI model 336 are a single or multi-layer perceptron neural network, a feed-forward neural network, a radial basis functional neural network, a recurrent neural network, or a modular neural network.

In some examples and features of the instant solution, the data validity risk level AI model 332 and the biometric recognition AI model 336 may include, but are not limited to, at least one of a machine learning model, a deep learning model, a neural network, any combination of models from the branches of AI, and the like, and it may be trained using at least one of the respective training methods for machine learning models, deep learning models, neural networks, any combination of models from the branches of AI, and the like. In some examples and features of the instant solution, the training data may include, but is not limited to, at least one of identity verification data, authentication data, customer authentication data, historical customer authentication data, identity check condition data, biometric data, image data, current financial record data, historical financial transaction data, model feedback data, and the like. In some examples and features of the instant solution, the training data for the data validity risk level AI model 332 and the biometric recognition AI model 336 may include, but are not limited to, internal data sources, external data sources, private data sources, public data sources, account data, third party data, configuration data, range data, or the like.

In some examples and features of the instant solution, the identity verification data may include, but is not limited, to governmental identification numbers, driver's license numbers, physical mailing addresses, property purchase records, and credit scores. The historical customer authentication data may include, but is not limited to, user identifiers, email addresses, media access control (MAC) addresses of the one or more computing devices 110 and previously used authentication source internet protocol (IP) addresses of the one or more computing devices 110. The biometric data may include, but is not limited to, fingerprint scans, facial feature data, voiceprint recordings, iris scans, retinal patterns, vein patterns, etc. In some examples and features of the instant solution, the data validity risk level AI model 332 may be trained and developed to predict data validity risk level. The model feedback records in the data validity risk level model feedback data 334 may include, but is not limited to, a predicted data validity risk level, a final data validity risk level, a received application data or device data, a determined identity check, a final product application identity check result (e.g. pass/fail), and an AI model request identifier. In some examples and features of the instant solution, the determined identity check may include, but not limited to, a function within the product application service 340, a query to an account data source 362, a query to a third-party data source 370, or the like. In some examples and features of the instant solution, the biometric recognition AI model 336 may be trained and developed to verify an applicant's identity. The model feedback records in the biometric recognition model feedback data 338 may include, but is not limited to, a biometric data, a biometric data type, a biometric target, a biometric recognition result, and an AI model request identifier. Once the data validity risk level AI model 332 and the biometric recognition AI model 336 are trained and validated, the models are deployed to an AI production system 230 (see, for example, FIGS. 2A-2C, 3A) for use by a product application service 340. The product application service 340 is an example of software service 140 (see, for example, FIG. 1, 2A-2C).

In some examples and features of the instant solution, during an online product application process, an applicant logs into a service client 160 (see FIG. 1) associated with a service provider offering a product. The software app 310, running on computing device 110, is an example of service client 160 (see FIG. 1). In some examples and features of the instant solution, when requesting a product, an applicant is presented with a product application form 312. The product application form 312 may include fields grouped based on the type of data being requested such as identification data, employment history, income, etc. As the applicant inputs data into the fields on the product application form 312, the data is collected and may be sent to the product application service 340. In some examples and features of the instant solution, the application data is streamed to the product application service 340 as it is input. In some examples and features of the instant solution, the application data is checkpointed into the groups of related product application form 312 data. In some examples and features of the instant solution, the application data is checkpointed for each page, section, or other area of the product application form 312.

In some examples and features of the instant solution, the product application service 340 receives product application data from the product application form 312. The application data may include, but is not limited to, the applicant's name, governmental identification number, driver's license number, current employment information, and financial account information. Additionally, the product application service 340 receives data about the computing device 110 which is being used by the applicant. The device data 316 may include, but is not limited to, the MAC address and the source IP address of the computing device. In some examples and features of the instant solution, the product application service 340 retrieves and formats the received application data and device data into feature sets that the AI model can interpret. When the product application service 340 receives application data and/or device data, the product application service 340 initiates a data validity risk level request to the data validity risk level AI model 332 resident on the AI production system 230 (see, for example, FIGS. 2A-2C, 3A), supplying the set of required data. When the product application service 340 receives biometric data, the product application service 340 initiates a biometric recognition request to the biometric recognition AI model 336 resident on the AI production system 230 (see, for example, FIGS. 2A-2C, 3A), supplying the set of required data. In some examples and features of the instant solution, the product application service 340 may continue to receive and process data from the product application form 312 in parallel while data validity risk levels and identity checks are determined.

In some examples and features of the instant solution, upon receiving the request, the AI production system 230 (see FIGS. 2A-2C, 3A), transforms 237 (see FIG. 2C) the set of required data into a set of valid feature values for the data validity risk level AI model 332. The data validity risk level AI model 332 is then executed with the transformed data, the result of which is a data validity risk level. In some examples and features of the instant solution, the data validity risk level is returned in a response to the product application service 340. In some examples and features of the instant solution, the response includes a request identifier that can be used by the product application service 340 to provide feedback on the performance of the data validity risk level AI model 332.

In some examples and features of the instant solution, upon receiving the response from the data validity risk level AI model 332, the product application service 340 determines at least one identity check 344 using the data validity risk level. The at least one identity check 344 may be executed with the received application data from the at least one data prompt 314 on the product application form 312 and/or the received device data 316 from the computing device 110.

In some examples and features of the instant solution, upon receiving the response from the data validity risk level AI model 332, the product application service 340 determines at least one identity check 344 to be performed based on the data validity risk level and in parallel the product application service 340 may continue to receive and process data from the product application form 312. In some examples and features of the instant solution, the product application service 340 utilizes a set of rules defined in service configuration data 360 to determine the at least one identity check 344 to be performed. The service configuration data 360 is an example of database 150 depicted in FIG. 1. In some examples and features of the instant solution, rules are identified using data validity risk level numeric ranges. In some examples and features of the instant solution, rules are identified using a finite set of risk categories.

In some examples and features of the instant solution, service configuration data 360 includes rules and parameters (such as data validity risk level thresholds and verification criteria) that are utilized in deciding the appropriate identity checks. These decisions may be based on a set of predefined rules that may categorize risk levels into low, medium, or high, each associated with different types of identity checks. In some examples and features of the instant solution, the at least one identity check 344 may involve cross-referencing the provided information against external databases (public or private), checking validity against third-party data sources, or internally validating details. This parallel handling is managed by multitasking capabilities of the processor, ensuring that data reception and processing do not stall the identity verification steps.

In some examples and features of the instant solution, the product application service 340 analyzes the received application data and dynamically determines in real-time or near real-time that the at least one identity check 344 may not be executed yet due to missing data or lack of data, thus, the product application service 340 requests the data prompt decision subsystem 324 to identify at least one additional data prompt 342 to collect additional application data needed to execute the at least one needed identity check 344. The data prompt decision subsystem 324 analyzes the received application data from the at least one data prompt 314 of the product application form 312, the inputs of the at least one identity check 344, and the predicted data validity risk level being above or below a configured threshold amount. Upon analyzing the predicted data validity risk level and determining the risk level is above a threshold amount (configured and accessed from service configuration data 360), the data prompt decision subsystem 324 determines biometric data is to be collected with the additional data prompt 342 because of the predicted risk level above a threshold and identifies a biometric data type. The biometric data type to be collected is dynamically determined based on the received device data 316 from the applicant's computing device 110, which may indicate characteristics, such as sensors and inputs, for collecting biometric data. From this analysis, the data prompt decision subsystem 324 creates at least one additional prompt 342, which may include instructions describing how to collect the biometric data using the applicant's computing device 110, and then invokes API 320 or UI 322 to augment the product application form 312 on the computing device 110 with the at least one additional prompt 342. Depending on the type of service client on the computing device 110, the API 320 or the UI 322 is utilized. When the installed software app 310 is a thick service client associated with the product application service 340, the product application service 340 and the data prompt decision subsystem 324 may control the graphical elements on the product application form 312 by invoking methods defined by the API 320. When the software app 310 is a browser-based service client, the product application service 340 and the data prompt decision subsystem 324 may invoke methods defined by the browser-based UI 322 to generate the graphical elements of the product application form 312. Meanwhile, the product application service 340 may continue to receive and process application data from the product application form 312.

In some examples and features of the instant solution, the data prompt decision subsystem 324 utilizes a set of rules defined in service configuration data 360 to identify the at least one additional data prompt 342. The service configuration data 360 is an example of database 150 depicted in FIG. 1. In some examples and features of the instant solution, rules are based on the inputs for the identity check 344. In some examples and features of the instant solution, rules are based on a set of application form data. In some examples and features of the instant solution, rules are based on a risk level being an amount above or below a threshold configured in service configuration data 360. In some examples and features of the instant solution, service configuration data 360 may include, but is not limited to, rules, risk level thresholds, statically defined data prompts prior to runtime execution, combinations of statically defined data prompts with dynamic substitutions that are updated during runtime execution, and the like.

In some examples and features of the instant solution, in response to receiving the additional application data based on the at least one additional data prompt 342, the product application service 340 may execute the at least one needed identity check 344. The at least one identity check 344 may involve cross-referencing the received data against external databases (public or private), checking validity against third-party services, or internally validating details such as credit history and governmental ID numbers. This parallel handling is managed by multitasking capabilities of the processor, ensuring that data reception and processing do not stall the identity verification steps.

In some examples and features of the instant solution, the at least one identity check 344 is initiated when the product application service 340 has the received data and/or collected data for the inputs of the identity check 344. In some examples and features of the instant solution, the identity check 344 utilizes service provider account data 362 to validate the applicant's identity. This account data may be associated with the applicant, or persons related to the applicant (such as a person associated with the applicant on a joint account). In some examples and features of the instant solution, this account data 362 may include identity data that the applicant supplied to the service provider when their account was created, such as, but not limited to, residential address, contact details, government issued identification numbers, personal identification number, signature, fingerprint, voiceprint, etc. In some examples and features of the instant solution, when biometric data is collected, the product application service 340 and/or the data prompt decision subsystem 324 may execute the biometric recognition AI model 336 on the collected biometric data to verify the applicant's identity. In some examples and features of the instant solution, the identity check 344 utilizes third-party data 370 that may include, but is not limited to, identity data, property records, financial account data and credit reporting data.

In some examples and features of the instant solution, the product application form 312 is updated upon receipt of the next checkpoint of application data. In some examples and features of the instant solution, the product application form 312 is updated when the final result of the at least one identity checks 344 is determined. In some examples and features of the instant solution, the product application form 312 is updated and augmented when the API 320 or UI 322 is invoked with additional data prompts to collect additional data.

In some examples and features of the instant solution, all of the at least one identity check 344 must be successful for the final result to be considered successful. In some examples and features of the instant solution, an identity check 344 is considered incomplete when a technical issue prevents its timely completion and an incomplete identity check results in a failed final result. In some examples and features of the instant solution, an incomplete identity check 344 does not impact the final result when a minimum number of the at least one identity check 344 completes successfully.

In some examples and features of the instant solution, an identity check 344 is considered incomplete when additional needed application data has not been collected yet for the identity check. In some examples and features of the instant solution, an identity check 344 is considered incomplete when the additional needed application data is collected, however, the identity check is still unable to conclusively verify the applicant's identity. While the identity check is considered incomplete, the data prompt decision subsystem 324 dynamically determines whether to identify and create another additional data prompt. This determination may be based on a maximum number of additional data prompts for the given identity check, which may be configured and accessed in the service configuration data 360. This determination may also be based on the number of acceptable forms of identification that are allowable for the applicant's city, municipality, county, township, state, country, etc., such as a state-issued ID, a state-issued driver's license, a county-issued voter registration ID, a country-issued passport, or the like. This determination may also be based on whether various forms of biometric data are available, given the capabilities of the applicant's computing device 110 to collect the requested biometric data, such as a microphone to capture a voice sample for voiceprint comparison, a sensor to detect a fingerprint for fingerprint recognition, a camera to capture an image of the applicant for facial recognition, etc. When the data prompt decision subsystem 324 determines it cannot proceed further with the identity check 344, a result for the incomplete identity check is included with the other identity check results 346.

In some examples and features of the instant solution, upon determining the at least one identity check 344 to be performed based on the predicted data validity risk level received from the data validity risk level AI model 332, the product application service 340 initiates the data prompt decision subsystem 324 to determine whether the received application data includes the data for the needed identity check 344. The data prompt decision subsystem 324 initiates a data input analysis, comparing the received application data against the inputs for the needed identity check. The analysis may include determining the received application data types and comparing them against the expected inputs for the needed identity check. The results of the data input analysis may conclude that the received application data is lacking at least one data that is needed for the identity check. For example, the received application data may reveal that the applicant does not possess specific forms of identification, such as a driver's license number because the applicant does not drive. Without valid forms of identification, the identity check 344 cannot be executed unless additional identification is collected. The analysis may determine the data validity risk level is an amount above a configured threshold, resulting in prompting the applicant for biometric data. Based on the data input analysis, the data prompt decision subsystem 324 performs data prompt identification to identify the types of additional application data to be collected and to identify a corresponding additional data prompt 342 that is applicable for the additional application data to be collected. For example, a set of valid identification types along with corresponding data prompts may be stored and accessed from service configuration data 360, configured statically before runtime execution or dynamically provisioned, updated, or determined during runtime execution.

When at least one additional data prompt 342 is identified and is created, the data prompt decision subsystem 324 invokes API 320 or UI 322 to augment the product application form 312 with the at least one additional data prompt 342. Depending on the type of service client on the computing device, API 320 or UI 322 is utilized. The API and the UI may define functions for the data prompt decision subsystem 324 to display graphical elements on the product application form 312, such as text fields, radio buttons, checkboxes, dropdown lists, buttons, help tips, scrollbars, pop-up dialogs, modals, progress bars, links, buttons, and the like, to display the additional data prompt 342 and to intake additional application data for further processing. In some examples and features of the instant solution, the additional data prompt 342 may include instructions to collect additional data, such as biometric data, using the capabilities of the applicant's computing device 110. For example, the additional data prompt 342 may utilize the computing device's microphone to record a voice sample for voiceprint comparison, sensor to detect a fingerprint for fingerprint recognition, camera to capture an image of the applicant for facial recognition, etc. In some examples and features of the instant solution, the additional data prompt 342 may include a link, a button, or a verbal prompt for the applicant to contact an entity for assistance, such as a contact center agent, an operator, or an AI assistant/chatbot.

In some examples and features of the instant solution, the graphical elements of the product application form 312 are statically defined and served to the software app 310. In some examples and features of the instant solution, the graphical elements of the product application form 312 are dynamically generated. In some examples and features of the instant solution, the graphical elements of the product application form 312 may comprise a combination of statically defined and dynamically generated graphical elements, where the dynamically generated graphical elements may augment statically defined areas of the product application form 312.

In some examples and features of the instant solution, the data prompt decision subsystem 324 may include a verbal prompt along with the additional data prompt 342 on the product application form 312, providing a communication option for the applicant to verbally utter a predefined prompt comprised of a sequence of reserved words which can be detected by the computing device's audio sensors, such as a microphone. The verbal prompt is displayed and enabled on the product application form 312 when the computing device 110 allows the software app 310 to utilize the microphone. When the software app 310 detects the verbal prompt, the verbal prompt feature is triggered, and the product application service 340 initiates contact with an entity for assistance. For example, the product application service 340 may initiate a communication session that connects the requested entity with the applicant, where the communication session may be a textual chat session, an audio call, or a video call, and where the requested entity may be a contact center agent, an operator, or an AI assistant/chatbot. In some examples and features of the instant solution, the entity may be configured to verbally prompt and to receive the additional application data verbally. This configuration may be statically configured and/or dynamically provisioned and stored in service configuration data 360. Not only does the product application service 340 receive the requested additional application data in a verbal response, but the product application service 340 may further use the verbal response to verify the applicant's identity by executing a biometric recognition AI model 336 on the verbal response and a previously verified voice sample of the applicant, stored and accessible in account data 362, to determine the validity of the received verbal response.

In some examples and features of the instant solution, the contacted entity may be an AI assistant/chatbot which may utilize one or more additional AI models, such as an AI model (not shown) deployed to the AI production system 230 (see, for example, FIGS. 2A-2C, 3A) or deployed to another AI production system (not shown) and trained to assist with the prompts and data presented on the product application form. The AI assistant/chatbot may be visually represented as an avatar on the user interface of the product application form 312 or the software app 310 and may be configured to accept verbal input or typed input from the applicant and to reply with audible output or text output.

In some examples and features of the instant solution, the additional data prompt 342 may display predefined text in combination with variable text that may be substituted in real-time or near real-time to provide a more descriptive prompt for collecting the additional application data. For example, the applicant did not provide any driver's license information in the previously received application data because the applicant does not drive. In identifying an appropriate data prompt, the data prompt decision subsystem 324 determines that in the applicant's state of residence, another valid form of identification is a state-issued identification card, and the data prompt decision subsystem 324 identifies an appropriate prompt, using predefined text in combination with variable text which can be substituted in real-time or near real-time to provide a more descriptive data prompt. For example, the prompt created by the data prompt decision subsystem 324 may state, "If you do not possess a New York state driver's license, please enter your New York state-issued identification card ID number, which can be found in the upper righthand corner". The underlined text is for demonstration purposes and indicates the dynamically inserted variable text. In this example, the data prompt decision subsystem 324 dynamically substitutes the name of the state where the applicant resides, as the applicant's residential address was previously provided with the received application data. Also, the data prompt decision subsystem 324 dynamically determined that only the ID number field is to be collected, as the applicant's name, birthdate, residence, etc. had already been received. In addition, a hint is included in the additional data prompt 342 to assist the applicant in finding the ID number on their state-issued identification card, further ensuring the additional application data is supplied.

In some examples and features of the instant solution, predefined static text for the additional data prompts may be configured prior to runtime execution of the instant solution and stored locally in the processor's communicatively coupled memory or stored in service configuration data 360, which may be a private databased co-located or distributed remotely on a network.

In some examples and features of the instant solution, the text for additional data prompts may be dynamically provisioned and updated during runtime execution of the instant solution and stored locally in the processor's communicatively coupled memory or stored in service configuration data 360, which may be a private database co-located or distributed remotely on the network.

In some examples and features of the instant solution, the data prompt decision subsystem 324 may utilize one or more additional AI models, such as an AI model (not shown) trained on additional data prompts, application form data, identity checks, and data validity risk levels, to dynamically generate data prompts to collect additional data. The one or more additional AI models may be deployed to the AI production system 230 (see, for example, FIGS. 2A-2C, 3A) or to another AI production system (not shown) and may be utilized by the data prompt decision subsystem 324.

In some examples and features of the instant solution, the product application service 340 and the data prompt decision subsystem 324 may continue to receive and process application form data from the product application form 312 in parallel while processing data input analysis, data prompt identification, identity checks, and the like.

In some examples and features of the instant solution, the product application service 340 and the data prompt decision subsystem 324 may invoke API 320 or UI 322 to display the additional data prompt 342 while awaiting or receiving additional application data from the product application form 312 or when the application data has been received.

In some examples and features of the instant solution, the execution of the at least one needed identity check 344 may trigger at least one identity check result 346. The identity check result 346 may be included in a model feedback record and incorporated into the model feedback data for further training of the data validity risk level AI model 332 and the biometric recognition AI model 336. Regardless of the identity check result 346 being a successful result or failed result, the result is used in the training process to further reinforce or refine the data validity risk level AI model 332 and the biometric recognition AI model 336.

In some examples and features of the instant solution, it is configured to add a model feedback record to the model feedback data and retrain the AI model with the model feedback data. The model feedback record includes several components that collectively capture the specifics of each instance where the AI model is applied. The identity check represents the model's assessment of the received data and determination of which identity verification checks to be performed. The final application identity check result includes the outcomes of any identity verification checks performed based on the AI model's determination. These detail whether the identity was verified successfully, any discrepancies found during the checks, and other relevant outcomes. The model feedback record may include details about the input data fed into the AI model, including application and device data, providing the analysis context. The model feedback record may detail the specific settings and parameters of the AI model at the time of the execution, such as thresholds used for decision-making, features included in the analysis, and other configuration details. The model feedback record also may include timestamps and other metadata like device identifiers, application versions, and user identifiers. The record may also include any feedback received from the execution. This may be direct feedback on the determination accuracy or indirect feedback inferred from subsequent user actions or additional verifications. By compiling these details into a model feedback record and incorporating them into the model feedback data, the AI model can be continually updated and refined.

Figure 3B:
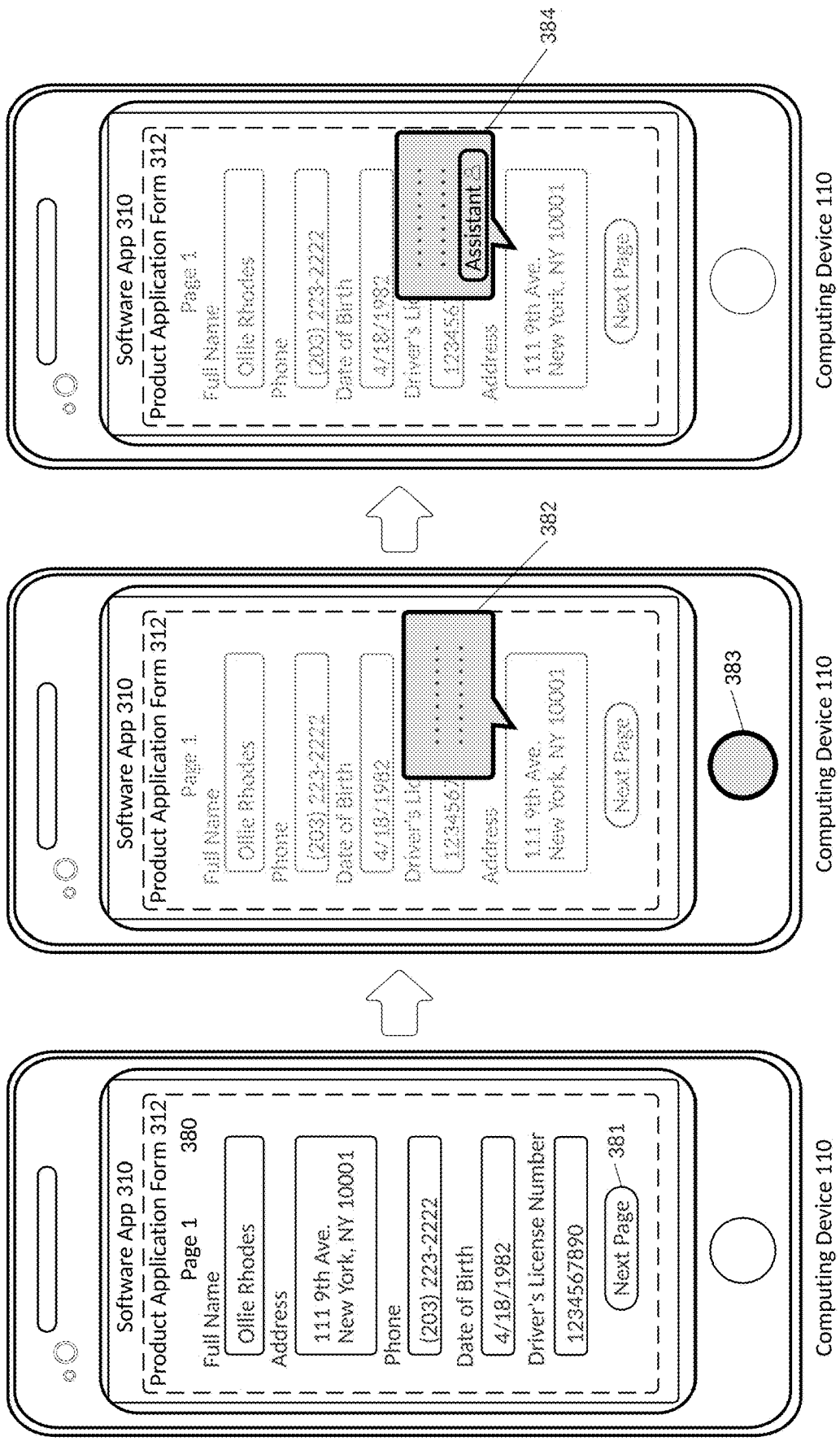
FIG. 3B is a diagram illustrating a method for augmenting the product application form with at least one additional data prompt to collect additional application data, such as biometric data, according to examples and features of the instant solution.

FIG. 3B illustrates a process 300B of a method for augmenting the product application form with at least one additional data prompt to collect additional application data, such as biometric data, according to examples and features of the instant solution. Referring to FIG. 3B, an example product application form 312 of a software app 310 is shown augmented with at least one additional data prompt to collect additional application data not received from the analyzed application data. The product application form in the example of FIG. 3B may be a checking account application form, shown with a first page 380 displaying text-based input fields for receiving application data such as name, address, phone number, date of birth, and driver's license, but may also include input fields for receiving image content, document content, biometric content, and the like.

According to various examples and features of the instant solution, checkpoints may be included within the product application form 312 of the software app 310. They may be detected/triggered when an applicant reaches a particular position within the product application form 312. For example, in FIG. 3B, when the applicant presses the next page button 381 on the first page 380 to navigate to the next page of the product application form 312, a checkpoint may be encountered. Here, software, such as the product application service 340 (see, for example, FIG. 3A), may receive a notification from the product application form 312 indicating that the applicant has reached the checkpoint. The product application service may instruct the software app 310 to perform a screen capture to capture any text content from the first page 380 that has been entered and send it to the product application service. The captured content may be used to determine one or more identity checks to perform. In some examples and features of the instant solution, the action of the next page button 381 may invoke API 320 or UI 322 (see, for example, FIG. 3A) to send the application data collected from the first page 380 to the product application service 340.

In the examples and features of the instant solution, the execution of the product application service on the host platform for processing the received application data is performed on the backend in parallel while the applicant is still completing the product application form 312 on the software app 310 of the applicant's computing device 110. Referring to FIG. 3B, while the product application form 312 is still in progress, the product application service continues to perform identity checks and other verification checks in parallel. Even when the identity checks on the applicant have been completed, other verification checks may continue in parallel while the product application form 312 is still being completed by the applicant. The product application service continuously processes the received application data, for example, verifying the received data pertaining to a data prompt from the application form while processing received data for another prompt from the application form, acquiring information from account data sources or external data sources for the identity checks and verification checks, and the like, all performed in parallel. The product application service may execute the data validity risk level AI model again to predict another data validity risk level when additional data has been collected. The parallel handling allows the product application service to determine in real-time or near real-time when the received application data is lacking and to identify and create at least one additional data prompt for the product application form 312 to collect additional application data for the needed verification.

In some examples and features of the instant solution, the augmentation of the product application form 312 may be based on a risk level, such as a data validity risk level for the received application data. Referring to the example in FIG. 3B, the applicant in this example recently moved to the state of New York and is applying for a checking account. The applicant inputs their name, their current New York address, their phone number, their date of birth, and their driver's license number issued by their former state of residence. When the applicant navigates to the next page by pressing the next page button 381, a checkpoint is triggered, and the collected application data is sent to the product application service on the host platform. Upon processing the received application data, the product application service 340 (see, for example, FIG. 3A) executes the data validity risk level AI model 332 (see, for example, FIG. 3A). The data validity risk level AI model 332 predicts a high data validity risk level because the applicant's address entered in the "Address" field does not align with the address associated with the "Driver's License Number" field, which is a driver's license issued from their former state of residence. Based on the data validity risk level being a high amount above a configured threshold, the data prompt decision subsystem 324 (see, for example, FIG. 3A) identifies from the received device data that the applicant's computing device has a sensor 383 to scan fingerprints, and the data prompt decision subsystem dynamically creates an additional data prompt to collect fingerprint biometric data. The data prompt decision subsystem invokes the API or the UI to augment the product application form 312. The augmentation displays the additional data prompt 382 with instructions on inputting the requested biometric data using the fingerprint sensor 383 on the applicant's computing device 110. The augmentation also disables the other input fields on the product application form 312 and may relocate the "Address" field in proximity to the "Driver's License Number" field, for example, to show that these are the fields that are resulting in the additional prompt for additional identity data. The additional data prompt 382 may request a fingerprint scan of a specific finger, such as the thumb on the right hand, and may provide instructions on how to position the finger on the sensor 383 for an accurate fingerprint scan. When the requested biometric data is not collected, the augmentation of the product application form 312 may include a subsequent additional data prompt 384 with an option to communicate with an entity for assistance, displayed in an area approximate to the input fields in question. For example, this additional data prompt 384 may include a link, a button, a verbal prompt, or the like, as an option for the applicant to contact an entity for assistance with the application form. The option may also allow the applicant to specify an entity type for assistance. When the applicant selects the option on the additional data prompt 384 displayed on the augmented application form 312, the option may be conveyed via the API 320 or the UI 322 to the product application service 340 (see, for example, FIG. 3A), and the product application service may initiate a communication session to connect the requested entity with the applicant, where the communication session may be a textual chat session, an audio call, a video call, or the like, and where the requested entity may be a contact center agent, an operator, or an AI assistant/chatbot. In some examples and features of the instant solution, the entity may be configured to verbally prompt and to receive the additional application data verbally. During the communication session with the requested entity, the product application service 340 may disable the remaining data prompts on the application form, such as visually changing the color of the remaining application data prompts to a gray text and preventing the input fields from accepting data until the additional application data associated with the additional data prompt has been collected and the needed identity check has been satisfied. When this occurs, the remaining data prompts on the application form are reenabled, allowing the remaining application data to be completed. All the while, the product application service and the data prompt decision subsystem continue processing identity checks and other verification checks in parallel.

In some examples and features of the instant solution, the augmentation of the product application form 312 (see, for example, FIG. 3A) is based on an additional identity check that is a continuum of a first identity check. For example, the application data collected for the first identity check may include a current address provided by the applicant on the product application form 312; however, this current address does not match a known address associated with the applicant's government-issued identification number. The product application service 340 (see, for example, FIG. 3A) determines a percentage of identity certainty based on the data validity risk level and requests the data prompt decision subsystem 324 (see, for example, FIG. 3A) to create an additional data prompt 342 (see, for example, FIG. 3A) specifically focused on the applicant's address for an additional identity check 344 (see, for example, FIG. 3A). For example, the additional data prompt 342 may augment the product application form 312 with a pop-up window appearing proximate to the at least one data prompt for the address. The additional data prompt 342 may display suggested answers that, if chosen correctly, would fully enable the at least one additional identity check 344 to be executed. The prompt may list several addresses from which the applicant is to choose, such as, "Please choose the address where you resided 10 years ago." When the received answer to the additional data prompt is correct, the product application service's certainty level of the applicant's identity may increase and exceed a configured threshold amount, for example, from an initial certainty level of 75% increasing to 95% certainty, thus exceeding the configured threshold. With this increased certainty level, the product application service 340 may execute a less stringent identity check 344 on the received application data. Meanwhile, an incorrect answer may initiate the product application service 340 to execute the data validity risk level AI model 332 (see, for example, FIG. 3A) again to predict another data validity risk level and to determine another additional data prompt 342.

In some examples and features of the instant solution, the product application service may request biometric data with the additional data prompt. The product application service may determine the computing device 110 can collect biometric data when the received computing device data 316 (see, for example, FIG. 3A), such as the model of the computing device, indicates the computing device has input capabilities, such as a camera, a microphone, a fingerprint sensor, etc.

In some examples and features of the instant solution, the additional data prompt may request biometric data, such as a self-portrait image, and may provide instructions to upload the at least one self-portrait image or to capture at least one self-portrait image using a camera on the computing device 110 to generate the at least one image. The additional data prompt may include one or more composition instructions describing the requested setting in the at least one image including, but not limited to, one or more of a specific background, a specific foreground, an image of the applicant, an image of an individual associated with the applicant, a particular facial expression, and a gesture. In some examples and features of the instant solution, at least one of the one or more composition instructions may be graphical in nature. In some examples and features of the instant solution, the prompt may include one or more instructions regarding a timeframe for when the at least one image may be taken and/or sent. In some examples and features of the instant solution, the prompt may include one or more instructions reporting an angle at which the at least one image may be taken. In some examples and features of the instant solution, upon receiving the at least one image, the product application service may confirm the specific setting and validate the at least one image of the applicant based on the confirmed specific setting. In some examples and features of the instant solution, the product application service initiates a biometric recognition request to the biometric recognition AI model 336 resident on the AI production system (see, for example, FIGS. 2A-2C, 3A), supplying the at least one image. In some examples and features of the instant solution, one or more trusted images of the setting and the applicant are supplied for comparison.

In some examples and features of the instant solution, the additional data prompt may request biometric data, such as a verbal recording, and may provide instructions to upload the at least one verbal recording or to capture at least one verbal recording using a microphone on the computing device 110 to capture the at least one verbal recording. The additional data prompt may include one or more instructions to verbalize specific phrases in the at least one verbal recording including, but not limited to, verbalizing one or more of the applicant's name, the applicant's address, numeric digits, a predetermined phrase, and the like. In some examples and features of the instant solution, the prompt may include one or more instructions regarding a timeframe for when the at least one verbal recording may be taken and/or sent. In some examples and features of the instant solution, upon receiving the at least one verbal recording, the product application service 340 (see, for example, FIG. 3A) may confirm the specific phrase and validate the at least one verbal recording of the applicant based on the confirmed specific phrase. In some examples and features of the instant solution, the product application service 340 initiates a biometric recognition request to the biometric recognition AI model 336 resident on the AI production system 230 (see, for example, FIGS. 2A-2C, 3A), supplying the at least one verbal recording. In some examples and features of the instant solution, one or more trusted verbal recordings of the applicant, such as previously verified verbal recordings of the applicant verbalizing the specific phrases, are supplied to the biometric recognition AI model 336 for comparison.

In some examples and features of the instant solution, referring to FIG. 3B, the additional data prompt 382 may request biometric data, such as a fingerprint scan, and may provide instructions to upload the at least one fingerprint scan or to capture at least one fingerprint scan using a fingerprint sensor 383 on the computing device 110 to capture the at least one fingerprint scan. The additional data prompt 382 may include one or more instructions to capture a specific finger's scan using the fingerprint sensor 383 on the computing device 110. In some examples and features of the instant solution, the prompt may include one or more instructions regarding a timeframe for when the at least one fingerprint scan may be taken and/or sent. In some examples and features of the instant solution, upon receiving the at least one fingerprint scan, the product application service may confirm the specific finger's scan and validate the at least one fingerprint scan of the applicant. In some examples and features of the instant solution, the product application service initiates a biometric recognition request to the biometric recognition AI model 336 resident on the AI production system 230 (see, for example, FIGS. 2A-2C, 3A), supplying the at least one fingerprint scan. In some examples and features of the instant solution, one or more trusted fingerprint scans of the applicant, such as previously verified fingerprint scans of the applicant, are supplied for comparison.

In some examples and features of the instant solution, the augmentation of the product application form 312 comprises inserting the at least one additional data prompt with a corresponding input field to collect the application data. The insertion of the additional data prompt and the corresponding input field may be positioned in real-time or near real-time after the currently active input field to provide a continuous user experience, allowing the applicant to input the requested data without detracting from the flow of the remainder of the product application form.

In some examples and features of the instant solution, the augmentation of the product application form 312 may include disabling the remaining prompts on the application form, such as visually changing the color of the remaining application data prompts to a gray text and preventing the input fields from accepting data until the additional application data associated with the additional data prompt has been collected and the needed identity check has been satisfied. Then the applicant may resume the product application form at the point when the augmentation occurred.

In some examples and features of the instant solution, the augmentation of the product application form 312 may include at least one additional data prompt immediately following a last receipt of the application data from at least one data prompt that is visible on the application form. In some examples and features of the instant solution, the at least one additional data prompt may be dynamically inserted inline on the current page of the application form after a visible data prompt and input field or after a currently active input field and data prompt. In some examples and features of the instant solution, when data prompts already exist on the current page of the application form, the at least one additional data prompt may be dynamically inserted on the next page or after the next checkpoint. For example, the additional data prompt may be related to a previous topic that is different than the data prompts on the current page; therefore, the data prompt decision subsystem dynamically determines that the augmentation of the application form may seamlessly occur on the next page or after the next checkpoint, and it provides an indication in the API or the UI invocation that the additional data prompt is not to be inserted immediately after the current visible data prompt.

In some examples and features of the instant solution, the augmentation of the product application form seamlessly inserts additional data prompts without the applicant being aware. For example, the remaining data prompts are shifted and repositioned to allocate an area for the at least one additional data prompt. If the data prompts are prefixed with sequential numbers, the at least one additional data prompt and the shifted data prompts may be renumbered to seamlessly preserve the sequential numbering without the applicant being aware of the insertion of the additional data prompt.

In some examples and features of the instant solution, the augmentation of the product application form 312 may include at least one additional data prompt responsive to the at least one needed identity check being satisfied. The data response, or the lack of data response, to the at least one additional data prompt may still be insufficient, thus another additional data prompt may be created to collect other data to satisfy the at least one needed identity check.

In some examples and features of the instant solution, the requested AI assistant/chatbot entity may utilize one or more additional AI models, such as an AI model (not shown) deployed to the AI production system 230 (see, for example, FIGS. 2A-2C, 3A) or deployed to another AI production system (not shown) and trained to assist with the prompts and data presented on the product application form. The AI assistant/chatbot may be visually represented as an avatar on the user interface of the product application form 312 or the software app 310 and may be configured to accept verbal input or typed input from the applicant and to reply with audible output or text output.

In some examples and features of the instant solution, the augmentation of the product application form 312 may include at least one additional data prompt being displayed as an overlay on the application form by the requested entity. For example, during the communication session with the requested entity, the entity may further prompt the applicant to provide relevant data for the at least one additional data prompt. Whether the entity's prompt is spoken or displayed as text, the product application service converts the entity's prompt and invokes the API or the UI to display the prompt and a corresponding input field as an overlay on the application form. The prompt and corresponding input field may accept typed input, or it may accept verbal input via the computing device's microphone, which then is converted into a format that the product application service can supply to the identity check. In some examples and features of the instant solution, the requested entity may be configured to verbally prompt and to receive the additional application data verbally.

Figure 4A:
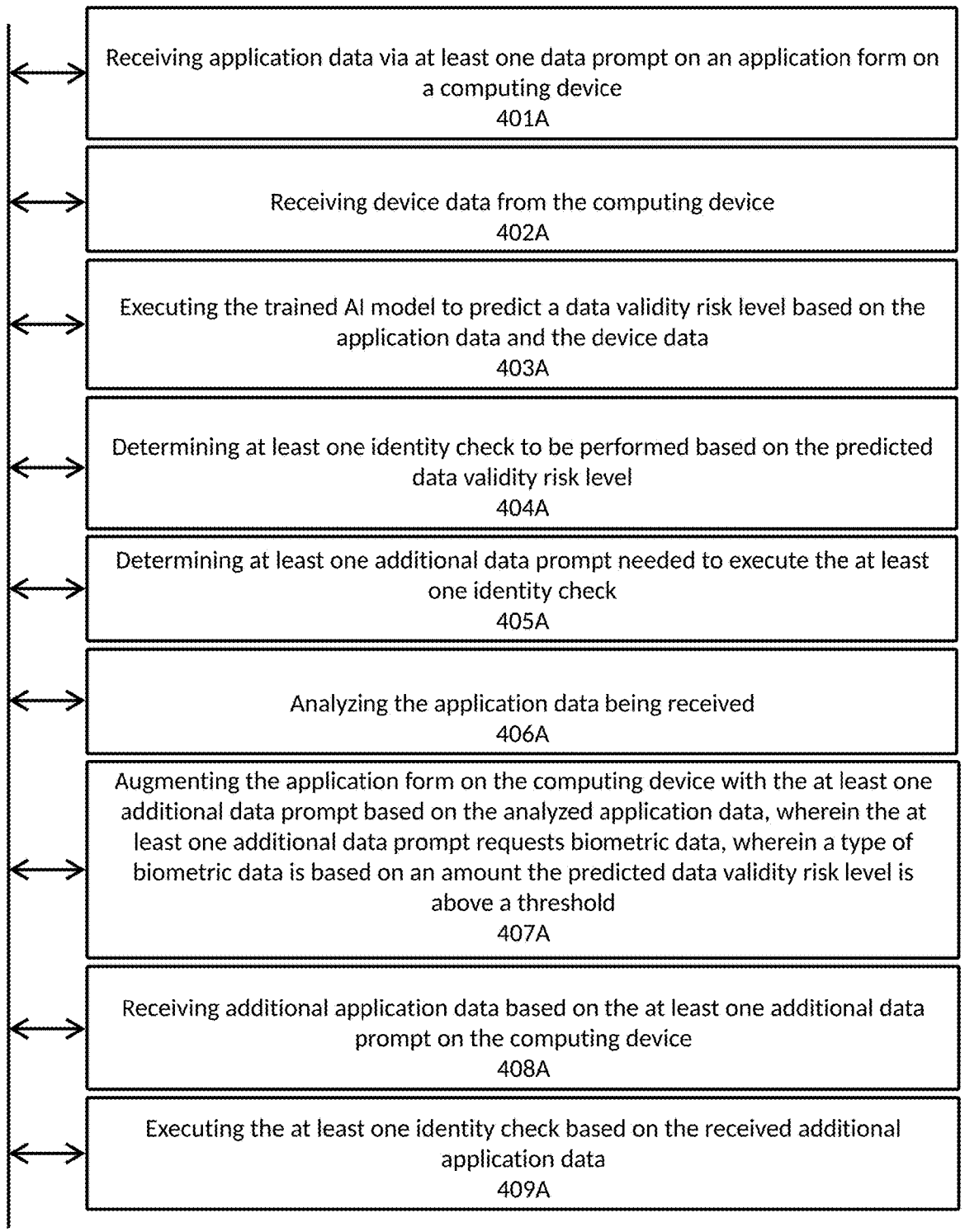
FIG. 4A is a flow diagram illustrating a method for a product application service that identifies and creates at least one additional prompt to collect additional application data, such as biometric data, when processing at least one needed identity check for a product application form, according to examples and features of the instant solution.

FIG. 4A illustrates an example of a method 400A for a product application service that identifies and creates at least one additional prompt to collect additional application data, such as biometric data, when processing at least one needed identity check for a product application form, according to examples and features of the instant solution. As an example, the method 400A may be performed by a computing system, a software application, a server, a cloud platform, a combination of systems, and the like. Referring to FIG. 4A, in 401A, the method may include receiving application data via at least one data prompt on an application form on a computing device. In 402A, the method may include receiving device data from the computing device. In 403A, the method may include executing a trained AI model to predict a data validity risk level based on the application data and the device data. In 404A, the method may include determining at least one identity check to be performed based on the predicted data validity risk level. In 405A, the method may include determining at least one additional data prompt needed to execute the at least one identity check. In 406A, the method may include analyzing the application data being received. In 407A, the method may include augmenting the application form on the computing device with the at least one additional data prompt based on the analyzed application data, wherein the at least one additional data prompt requests biometric data, wherein a type of biometric data is based on an amount the predicted data validity risk level is above a threshold. In 408A, the method may include receiving additional application data based on the at least one additional data prompt on the computing device. In 409A, the method may include executing the at least one identity check based on the received additional application data.

Figure 4B:
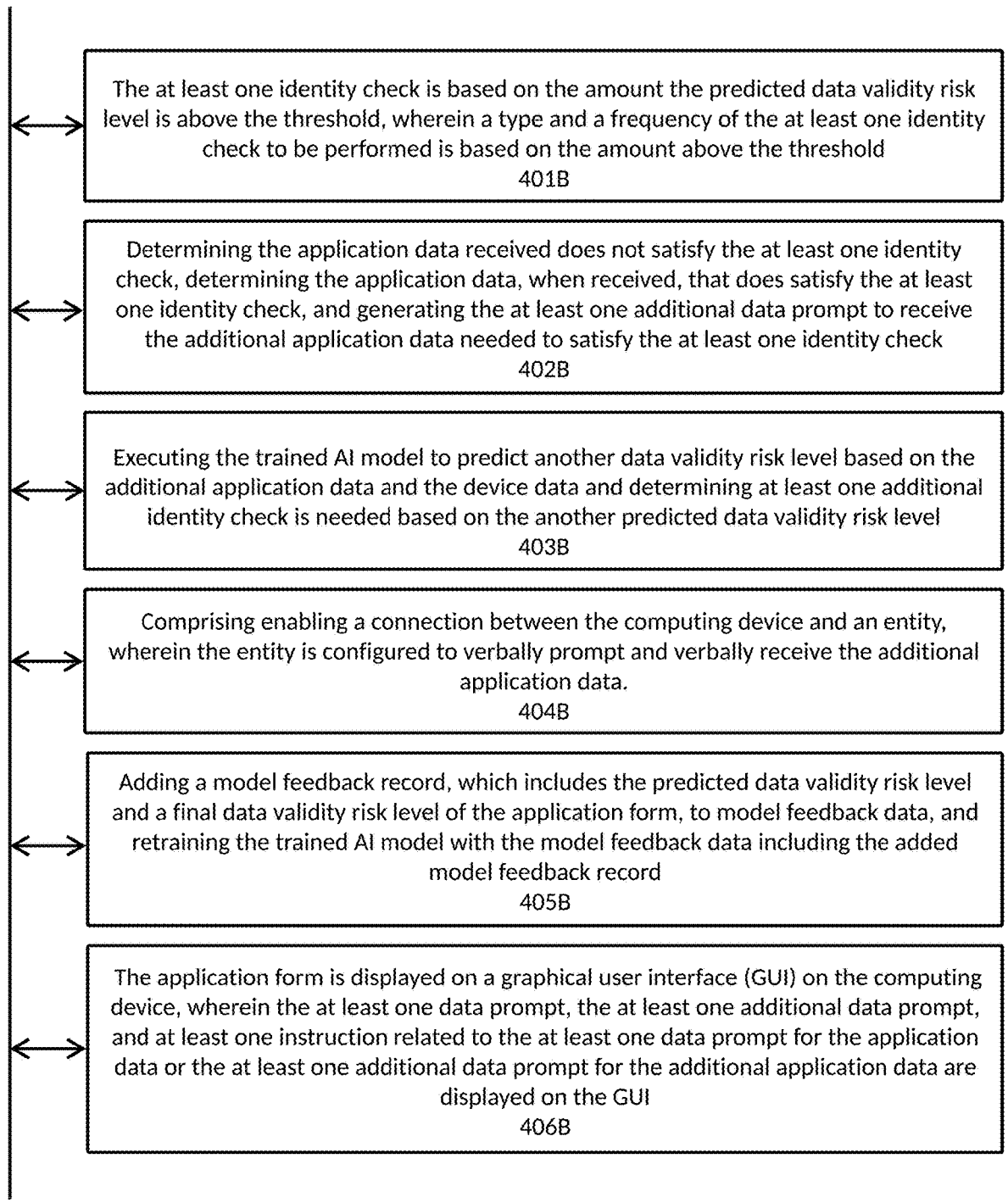
FIG. 4B is another flow diagram illustrating a method for a product application service that identifies and creates at least one additional prompt to collect additional application data, such as biometric data, when processing at least one needed identity check for a product application form, according to examples and features of the instant solution.

FIG. 4B illustrates another method 400B for a product application service that identifies and creates at least one additional prompt to collect additional application data, such as biometric data, when processing at least one needed identity check for a product application form, according to examples and features of the instant solution. As an example, the method 400B may be performed by a computing system, a software application, a server, a cloud platform, a combination of systems, and the like. Referring to FIG. 4B, in 401B, the method may include the at least one identity check based on the amount the predicted data validity risk level is above the threshold, wherein a type and a frequency of the at least one identity check to be performed is based on the amount above the threshold. In 402B, the method may include determining the application data received does not satisfy the at least one identity check, determining the application data, when received, that does satisfy the at least one identity check, and generating the at least one additional data prompt to receive the additional application data needed to satisfy the at least one identity check. In 403B, the method may include executing the trained AI model to predict another data validity risk level based on the additional application data and the device data and determining at least one additional identity check is needed based on the another predicted data validity risk level. In 404B, the method may include enabling a connection between the computing device and an entity, wherein the entity is configured to verbally prompt and verbally receive the additional application data. In 405B, the method may include adding a model feedback record, which includes the predicted data validity risk level and a final data validity risk level of the application form, to the model feedback data and retraining the trained AI model with model feedback data including the added model feedback record. In 406B, the method may include the application form displayed on a graphical user interface (GUI) on the computing device, wherein the at least one data prompt, the at least one additional data prompt, and at least one instruction related to the at least one data prompt for the application data or the at least one additional data prompt for the additional application data are displayed on the GUI.

Figure 5:
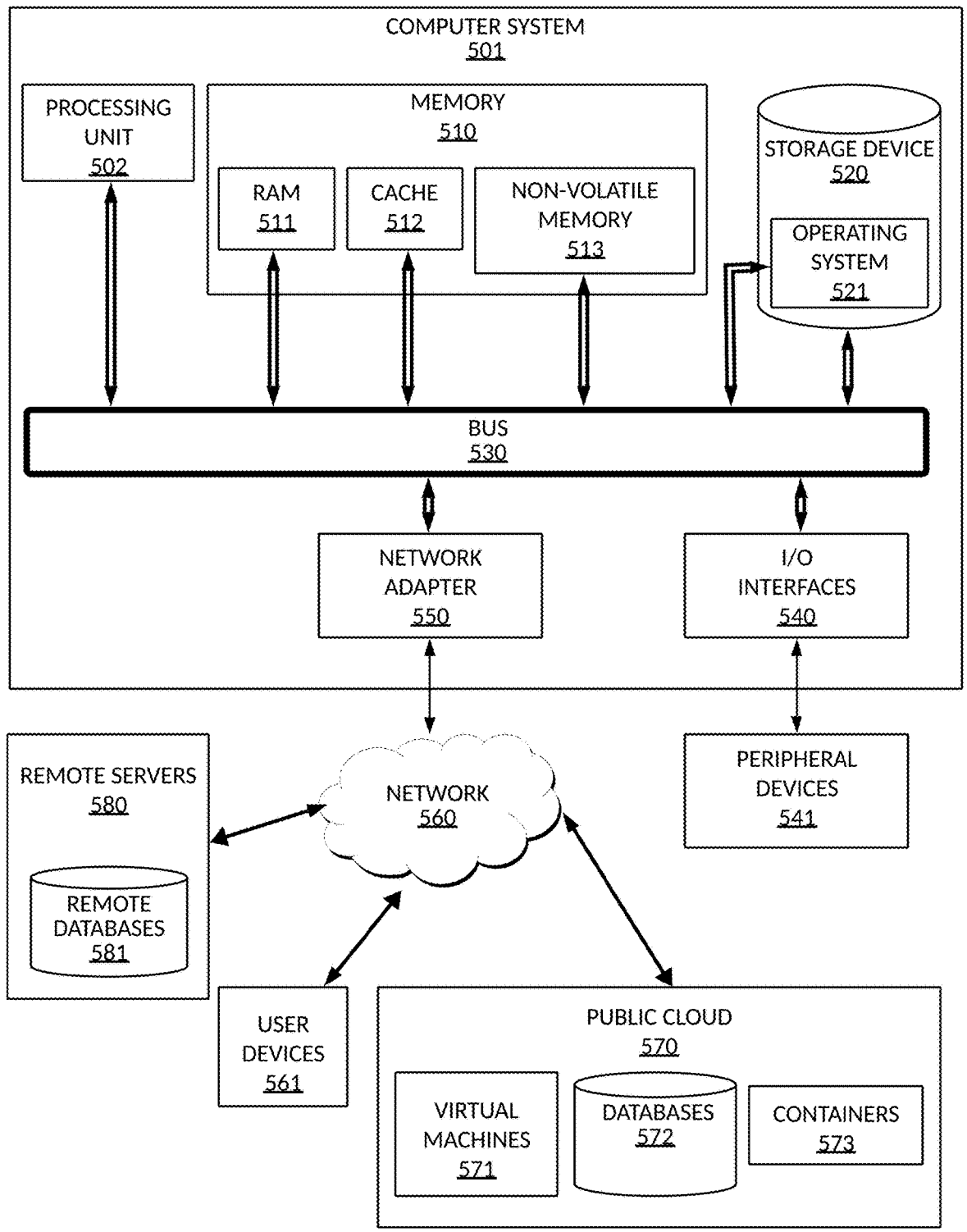
FIG. 5 is a system diagram illustrating a computing environment according to the instant solution's example features, structures, or characteristics.

The examples and features of the instant solution may be implemented in one or more of the elements described or depicted herein, including for example, the elements described or depicted in FIG. 5. These examples and features may further be implemented in hardware, in a computer program executed by a processor, in firmware, or in a combination of the above. A computer program may be embodied on a computer readable medium, such as a storage medium. For example, a computer program may reside in random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or any other form of storage medium known in the art.

An exemplary storage medium may be communicatively coupled to the processor such that the processor may read information from, and write information to, the storage medium. In the alternative, the storage medium may be integral to the processor. The processor and the storage medium may reside in an application specific integrated circuit (ASIC). In the alternative, the processor and the storage medium may reside as discrete components. For example, FIG. 5 illustrates an example computer system architecture, which may represent or be integrated in any of the above-described components, etc.

FIG. 5 illustrates a computing environment according to the instant solution's example features, structures, or characteristics. FIG. 5 is not intended to suggest any limitation as to the scope of use or functionality of features, structures, or characteristics of the instant solution of the application described herein. Regardless, the computing environment 500 can be implemented to perform any of the functionalities described herein. In computing environment 500, there is a computer system 501, operational within numerous other general-purpose or special-purpose computing system environments or configurations.

Computer system 501 may take the form of a desktop computer, laptop computer, tablet computer, smartphone, smartwatch or other wearable computer, server computer system, thin client, thick client, network computer system, minicomputer system, mainframe computer, quantum computer, and distributed cloud computing environment that include any of the described systems or devices, and the like or any other form of computer or mobile device now known or to be developed in the future that is capable of running a program, accessing a network 560 or querying a database. Depending upon the technology, the performance of a computer-implemented method may be distributed among multiple computers and among multiple locations. However, in this presentation of the computing environment 500, a detailed discussion is focused on a single computer, specifically computer system 501, to keep the presentation as simple as possible.

Computer system 501 may be located in a cloud, even though it is not shown in a cloud in FIG. 5. On the other hand, computer system 501 may not be in a cloud except to any extent as may be affirmatively indicated. Computer system 501 may be described in the general context of computer system-executable instructions, such as program modules, executed by a computer system 501. Generally, program modules may include routines, programs, objects, components, logic, data structures, and so on that perform tasks or implement certain abstract data types. As shown in FIG. 5, computer system 501 in computing environment 500 is shown in the form of a general-purpose computing device. The components of computer system 501 may include, but are not limited to, at least one processor or processing unit 502, a system memory 510, and a bus 530 that couples various system components, including system memory 510 to processing unit 502.

Processing unit 502 includes at least one computer processor of any type now known or to be developed. The processing unit 502 may contain circuitry distributed over multiple integrated circuit chips. The processing unit 502 may also implement multiple processor threads and multiple processor cores. Cache 512 is a memory that may be in the processor chip package(s) or located "off-chip," as depicted in FIG. 5. Cache 512 is typically used for data or code accessed by the threads or cores running on the processing unit 502. In some computing environments, processing unit 502 may be designed to work with qubits and perform quantum computing.

Memory 510 is any volatile memory now known or to be developed in the future. Examples include dynamic random-access memory (RAM) 511 or static type RAM 511. Typically, the volatile memory is characterized by random access, but this may not be the characterization unless affirmatively indicated. In computer system 501, memory 510 is in a single package. It is internal to computer system 501, but alternatively or additionally, the volatile memory may be distributed over multiple packages and/or located externally with respect to computer system 501. By way of example, memory 510 can be provided for reading from and writing to a non-removable, non-volatile magnetic media (shown as storage device 520, and typically called a "hard drive"). Memory 510 may include at least one program product having a set (e.g., at least one) of program modules configured to carry out the functions of various features, structures, or characteristics of the instant solution of the application. A typical computer system 501 may include cache 512, a specialized volatile memory generally faster than RAM 511 and generally located closer to the processing unit 502. Cache 512 stores frequently accessed data and instructions accessed by the processing unit 502 to speed up processing time. The computer system 501 may also include non-volatile memory 513 in the form of ROM, PROM, EEPROM, and flash memory. Non-volatile memory 513 often contains programming instructions for starting the computer, including the basic input/output system (BIOS) and information to start the operating system 521.

Computer system 501 may include a removable/non-removable, volatile/non-volatile computer storage device 520. For example, storage device 520 can be a non-removable, non-volatile magnetic media (not shown and typically called a "hard drive"). At least one data interface can connect it to the bus 530. In features, structures, or characteristics of the instant solution where computer system 501 has a large amount of storage (for example, where computer system 501 locally stores and manages a large database), then this storage may be provided by peripheral storage devices 520 designed for storing very large amounts of data, such as a storage area network (SAN) that is shared by multiple, geographically distributed computers.

The operating system 521 is software that manages computer system 501 hardware resources and provides common services for computer programs. Operating system 521 may take several forms, such as various known proprietary operating systems or open-source Portable Operating System Interface type operating systems that employ a kernel.

The bus 530 represents at least one of several types of bus structures, including a memory bus or memory controller, a peripheral bus, an accelerated graphics port, and a processor or local bus using various bus architectures. By way of example, and not limitation, such architectures include Industry Standard Architecture (ISA) buses, Micro Channel Architecture (MCA) buses, Enhanced ISA (EISA) buses, Video Electronics Standards Association (VESA) local buses, and Peripheral Component Interconnect (PCI) bus. The bus 530 is the signal conduction path that allows the various components of computer system 501 to communicate.

Computer system 501 may communicate with at least one peripheral device, 541, via an input/output (I/O) interface, 540. Such devices may include a keyboard, a pointing device, a display, etc.; at least one device that enables a user to interact with computer system 501; and/or any devices (e.g., network card, modem, etc.) that enable computer system 501 to communicate with at least one other computing devices. Such communication can occur via I/O interface 540. As depicted, I/O interface 540 communicates with the other components of computer system 501 via bus 530.

Network adapter 550 enables the computer system 501 to connect and communicate with at least one network 560, such as a local area network (LAN), a wide area network (WAN), and/or a public network (e.g., the Internet). It bridges the computer's internal bus 530 and the external network, exchanging data efficiently and reliably. The network adapter 550 may include hardware, such as modems or Wi-Fi signal transceivers, and software for packetizing and/or de-packetizing data for communication network transmission. Network adapter 550 supports various communication protocols to ensure compatibility with network standards. Ethernet connections adhere to protocols such as IEEE 802.3, while wireless communications might support IEEE 802.11 standards, Bluetooth, near-field communication (NFC), or other network wireless radio standards.

Network 560 is any computer network that can receive and/or transmit data. Network 560 can include a WAN, LAN, private cloud, or public Internet, capable of communicating computer data over non-local distances by any technology that is now known or to be developed in the future. Any connection depicted can be wired and/or wireless and may traverse other components that are not shown. In some features, structures, or characteristics of the instant solution, a network 560 may be replaced and/or supplemented by LANs designed to communicate data between devices in a local area, such as a Wi-Fi network. The network 560 typically includes computer hardware such as copper transmission cables, optical transmission fibers, wireless transmission, routers, firewalls, switches, gateway computers, edge servers, and network infrastructure known now or to be developed in the future. Computer system 501 connects to network 560 via network adapter 550 and bus 530.

User devices 561 are any computer systems used and controlled by an end user in connection with computer system 501. For example, in a hypothetical case where computer system 501 is designed to provide a recommendation to an end user, this recommendation may typically be communicated from network adapter 550 of computer system 501 through network 560 to a user device 561, allowing user device 561 to display, or otherwise present, the recommendation to an end user. User devices can be a wide array, including personal computers, laptops, tablets, hand-held, mobile phones, etc.

A public cloud 570 is an on-demand availability of computer system resources, including data storage and computing power, without direct active management by the user. Public clouds 570 are often distributed, with data centers in multiple locations for availability and performance. Computing resources on public clouds 570 are shared across multiple tenants through virtual computing environments comprising virtual machines 571, databases 572, containers 573, and other resources. A container 573 is an isolated, lightweight software for running a software application on the host operating system 521. Containers 573 are built on top of the host operating system's kernel and contain software applications and some lightweight operating system APIs and services. In contrast, virtual machine 571 is a software layer with an operating system 521 and kernel. Virtual machines 571 are built on top of a hypervisor emulation layer designed to abstract a host computer's hardware from the operating software environment. Public clouds 570 generally offers databases 572, abstracting high-level database management activities. At least one element described or depicted in FIG. 5 can perform at least one of the actions, functionalities, or features described or depicted herein.

Remote servers 580 are any computers that serve at least some data and/or functionality over a network 560, for example, WAN, a virtual private network (VPN), a private cloud, or via the Internet to computer system 501. These networks 560 may communicate with a LAN to reach users. The user interface may include a web browser or a software application that facilitates communication between the user and remote data. Such software applications have been referred to as "thin" desktop software applications or "thin clients." Thin clients typically incorporate software programs to emulate desktop sessions. Mobile device software applications can also be used. Remote servers 580 can also host remote databases 581, with the database located on one remote server 580 or distributed across multiple remote servers 580. Remote databases 581 are accessible from database client applications installed locally on the remote server 580, other remote servers 580, user devices 561, or computer system 501 across a network 560. An AI/ML model described or depicted here may reside fully or partially on any of the elements described or depicted in FIG. 5.

Although an exemplary example of the instant solution of at least one of an apparatus, method, and computer readable medium has been illustrated in the accompanying drawings and described in the foregoing detailed description, it will be understood that the instant solution is not limited to the examples of the instant solution disclosed but is capable of numerous rearrangements, modifications, and substitutions as set forth and defined by the following claims. For example, the instant solution's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that the instant solution may be embodied as a personal computer, a server, a console, a personal digital assistant (PDA), a cell phone, a tablet computing device, a smartphone, or any other suitable computing device, or combination of devices. Presenting the above-described functions as being performed by the instant solution is not intended to limit the scope of the present instant solution in any way but is intended to provide one example of the many examples of the instant solution. Indeed, methods, systems, and apparatuses disclosed herein may be implemented in localized and distributed forms consistent with computing technology.

It should be noted that some of the instant solution features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module may not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory, tape, or any other such medium used to store data.

Indeed, a module of executable code may be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the instant solution, as generally described and illustrated in the figures herein, may be arranged and designed in a wide variety of different configurations. Thus, the detailed descriptions of the instant solution and the examples and features of the instant solution are not intended to limit the scope of the instant solution as claimed but are merely representative examples of the instant solution.

One having ordinary skill in the art will readily understand that the above may be practiced with steps in a different order and/or with hardware elements in configurations that are different from those which are disclosed. Therefore, although the instant solution has been described based upon these preferred examples and features of the instant solution, it would be apparent to those of skill in the art that certain modifications, variations, and alternative constructions would be apparent.

While preferred examples of the present instant solution have been described, it is to be understood that the examples described are illustrative only, and the scope of the instant solution is to be defined solely by the appended claims when considered with a full range of equivalents and modifications (e.g., protocols, hardware devices, software platforms, etc.) thereto.

What is claimed is:

1. An apparatus comprising:
    a processor; and
    a memory, wherein the processor and the memory are communicatively coupled, wherein the processor is configured to:
    receive application data via at least one data prompt on an application form on a computing device;
    receive device data from the computing device;
    execute a trained artificial intelligence (AI) model to predict a data validity risk level based on the application data and the device data;
    determine at least one identity check to be performed based on the predicted data validity risk level;
    determine at least one additional data prompt needed to execute the at least one identity check;
    analyze the application data being received;
    augment the application form on the computing device with the at least one additional data prompt based on the analyzed application data, wherein the at least one additional data prompt requests biometric data, wherein a type of biometric data is based on an amount the predicted data validity risk level is above a threshold;
    receive additional application data based on the at least one additional data prompt on the computing device; and
    execute the at least one identity check based on the received additional application data.

2. The apparatus of claim 1, wherein the at least one identity check is based on the amount the predicted data validity risk level is above the threshold, wherein a type and a frequency of the at least one identity check to be performed is based on the amount above the threshold.

3. The apparatus of claim 1, wherein the processor is configured to:
    determine the application data received does not satisfy the at least one identity check;
    determine the application data, when received, that does satisfy the at least one identity check; and
    generate the at least one additional data prompt to receive the additional application data needed to satisfy the at least one identity check.

4. The apparatus of claim 1, wherein the processor is configured to:
    execute the trained AI model to predict another data validity risk level based on the additional application data and the device data; and
    determine at least one additional identity check is needed based on the another predicted data validity risk level.

5. The apparatus of claim 1, wherein the processor is configured to enable a connection between the computing device and an entity, wherein the entity is configured to verbally prompt and verbally receive the additional application data.

6. The apparatus of claim 1, wherein the processor is configured to:
    add a model feedback record, which includes the predicted data validity risk level and a final data validity risk level of the application form, to model feedback data; and
    retrain the trained AI model with the model feedback data including the added model feedback record.

7. The apparatus of claim 1, wherein the application form is displayed on a graphical user interface (GUI) on the computing device, wherein the at least one data prompt, the at least one additional data prompt, and at least one instruction related to the at least one data prompt for the application data or the at least one additional data prompt for the additional application data are displayed on the GUI.

8. A method comprising:
    receiving application data via at least one data prompt on an application form on a computing device;
    receiving device data from the computing device;
    executing a trained artificial intelligence (AI) model to predict a data validity risk level based on the application data and the device data;
    determining at least one identity check to be performed based on the predicted data validity risk level;
    determining at least one additional data prompt needed to execute the at least one identity check;
    analyzing the application data being received;
    augmenting the application form on the computing device with the at least one additional data prompt based on the analyzed application data, wherein the at least one additional data prompt requests biometric data, wherein a type of biometric data is based on an amount the predicted data validity risk level is above a threshold;
    receiving additional application data based on the at least one additional data prompt on the computing device; and
    executing the at least one identity check based on the received additional application data.

9. The method of claim 8, wherein the at least one identity check is based on the amount the predicted data validity risk level is above the threshold, wherein a type and a frequency of the at least one identity check to be performed is based on the amount above the threshold.

10. The method of claim 8, comprising:
  determining the application data received does not satisfy the at least one identity check;
  determining the application data, when received, that does satisfy the at least one identity check; and
  generating the at least one additional data prompt to receive the additional application data needed to satisfy the at least one identity check.

11. The method of claim 8, comprising:
  executing the trained AI model to predict another data validity risk level based on the additional application data and the device data; and
  determining at least one additional identity check is needed based on the another predicted data validity risk level.

12. The method of claim 8, comprising enabling a connection between the computing device and a entity, wherein the entity is configured to verbally prompt and verbally receive the additional application data.

13. The method of claim 8, comprising:
  adding a model feedback record, which includes the predicted data validity risk level and a final data validity risk level of the application form, to model feedback data; and
  retraining the trained AI model with the model feedback data including the added model feedback record.

14. The method of claim 8, comprising, wherein the application form is displayed on a graphical user interface (GUI) on the computing device, wherein the at least one data prompt, the at least one additional data prompt, and at least one instruction related to the at least one data prompt for the application data or the at least one additional data prompt for the additional application data are displayed on the GUI.

15. A computer-readable storage medium comprising instructions stored therein which when executed by a processor cause the processor to perform:
  receiving application data via at least one data prompt on an application form on a computing device;
  receiving device data from the computing device;
  executing a trained artificial intelligence (AI) model to predict a data validity risk level based on the application data and the device data;
  determining at least one identity check to be performed based on the predicted data validity risk level;
  determining at least one additional data prompt needed to execute the at least one identity check;
  analyzing the application data being received;
  augmenting the application form on the computing device with the at least one additional data prompt based on the analyzed application data, wherein the at least one additional data prompt requests biometric data, wherein a type of biometric data is based on an amount the predicted data validity risk level is above a threshold;
  receiving additional application data based on the at least one additional data prompt on the computing device; and
  executing the at least one identity check based on the received additional application data.

16. The computer-readable storage medium of claim 15, wherein the at least one identity check is based on the amount the predicted data validity risk level is above the threshold, wherein a type and a frequency of the at least one identity check to be performed is based on the amount above the threshold.

17. The computer-readable storage medium of claim 15, wherein the processor is configured to perform:
  determining the application data received does not satisfy the at least one identity check;
  determining the application data, when received, that does satisfy the at least one identity check; and
  generating the at least one additional data prompt to receive the additional application data needed to satisfy the at least one identity check.

18. The computer-readable storage medium of claim 15, wherein the processor is configured to perform:
  executing the trained AI model to predict another data validity risk level based on the additional application data and the device data; and
  determining at least one additional identity check is needed based on the another predicted data validity risk level.

19. The computer-readable storage medium of claim 15, wherein the processor is configured to perform enabling a connection between the computing device and an entity, wherein the entity is configured to verbally prompt and verbally receive the additional application data.

20. The computer-readable storage medium of claim 15, wherein the processor is configured to perform:
  adding a model feedback record, which includes the predicted data validity risk level and a final data validity risk level of the application form, to model feedback data; and
  retraining the trained AI model with the model feedback data including the added model feedback record.

* * * * *